United States Patent
Hart et al.

(10) Patent No.: US 11,046,514 B2
(45) Date of Patent: Jun. 29, 2021

(54) CARRIAGE LIFT ASSEMBLY FOR STORAGE HANDLING AND ARTICLE RETRIEVAL

(71) Applicant: Intelligrated Headquarters, LLC, Mason, OH (US)

(72) Inventors: Benjamin Hart, Mason, OH (US); Anthony Turco, Mason, OH (US); Jarl Nicholas Sebastian, Mason, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 235 days.

(21) Appl. No.: 16/119,266

(22) Filed: Aug. 31, 2018

(65) Prior Publication Data
US 2020/0071074 A1    Mar. 5, 2020

(51) Int. Cl.
*B65G 1/06* (2006.01)
*B66B 7/06* (2006.01)
(Continued)

(52) U.S. Cl.
CPC .............. *B65G 1/06* (2013.01); *B66B 7/068* (2013.01); *B66B 11/02* (2013.01); *F16C 19/06* (2013.01);
(Continued)

(58) Field of Classification Search
CPC .... B65G 1/06; B65G 2201/025; B66B 7/068; B66B 11/02; B66B 11/006; F16C 19/06
See application file for complete search history.

(56) References Cited

U.S. PATENT DOCUMENTS

| 4,442,922 A | 4/1984 | Johannson |
| 4,999,902 A | 3/1991 | Schumacher |

(Continued)

FOREIGN PATENT DOCUMENTS

| CN | 105000451 A | 10/2015 |
| CN | 105730956 A | 7/2016 |

(Continued)

OTHER PUBLICATIONS

Automated Storage and Retrieval Machine for Pallets, Dec. 3, 2013, https://www.youtube.com/watch?reload=9&v=NYDESB84gb0, Oct. 30, 2018.
(Continued)

*Primary Examiner* — Saul Rodriguez
*Assistant Examiner* — Ashley K Romano
(74) *Attorney, Agent, or Firm* — Alston & Bird LLP

(57) ABSTRACT

The present disclosure relates to a carriage lift assembly including a mast member, a top and bottom bearing assembly, one or more belt members, one or more belt tensioner assemblies, and one or more carriage assemblies. Each belt tensioner assembly defines a first clamping block and a second clamping block for securing a first and a second end, respectively, of a belt member to provide initial tension, and a pair of bolt members adjusted to move a slidable plate member upon which the second block is coupled to provide final tension. Each carriage assembly is removably attached to a corresponding belt tensioner assembly, and defines a center plate and two side plates. Each side plate defines at least a removable set of guiding wheels and a first set of guiding members.

20 Claims, 27 Drawing Sheets

(51) Int. Cl.
  *B66B 11/00* (2006.01)
  *F16C 19/06* (2006.01)
  *B66B 11/02* (2006.01)

(52) U.S. Cl.
  CPC ....... *B65G 2201/025* (2013.01); *B66B 11/006* (2013.01)

(56) References Cited

U.S. PATENT DOCUMENTS

| | | |
|---|---|---|
| 5,149,241 A | 9/1992 | Haymore et al. |
| 5,279,393 A | 1/1994 | Lloyd |
| 8,292,039 B2 | 10/2012 | Campbell et al. |
| 2011/0203876 A1 | 8/2011 | Skinner et al. |
| 2013/0209203 A1 | 8/2013 | Rafols |
| 2015/0158670 A1* | 6/2015 | Kainuma .................. B66F 9/07 414/277 |
| 2015/0298939 A1 | 10/2015 | Lampinen |
| 2018/0050884 A1* | 2/2018 | Shen ....................... B66B 7/068 |
| 2018/0362302 A1* | 12/2018 | Hollowell ............... B66B 15/04 |

FOREIGN PATENT DOCUMENTS

| | | |
|---|---|---|
| CN | 107089619 A | 8/2017 |
| CN | 107098292 A | 8/2017 |
| DE | 19614660 A1 | 10/1997 |
| EP | 1479643 A1 | 11/2014 |

OTHER PUBLICATIONS

Combined Search and Examination Report for British Appolocation No. 1911995.7, dated Feb. 11, 2020, 6 pages.

Office Action issued in Chinese Application No. 201910704122.1, dated Nov. 2, 2020, 5 pages.

* cited by examiner

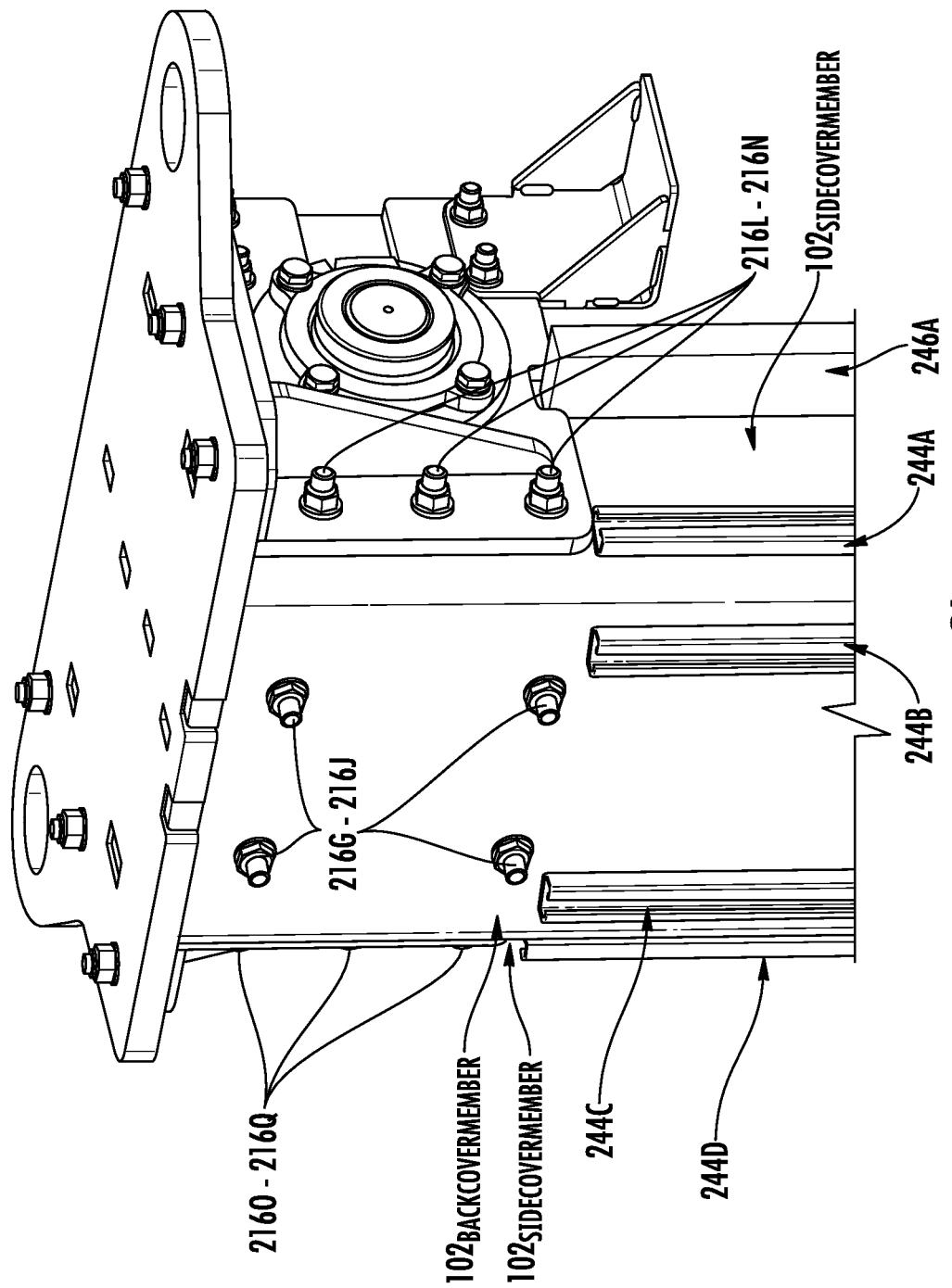

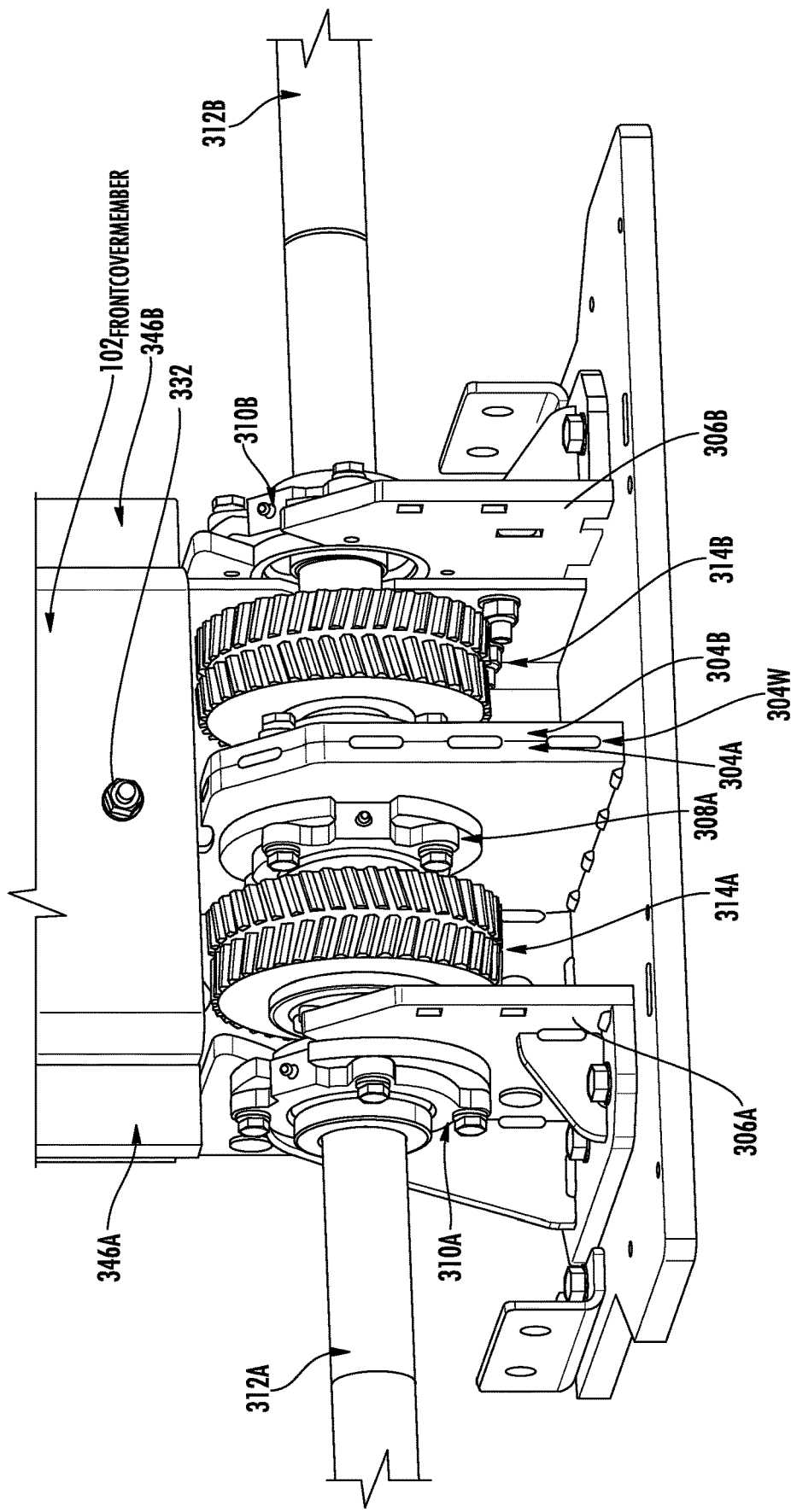

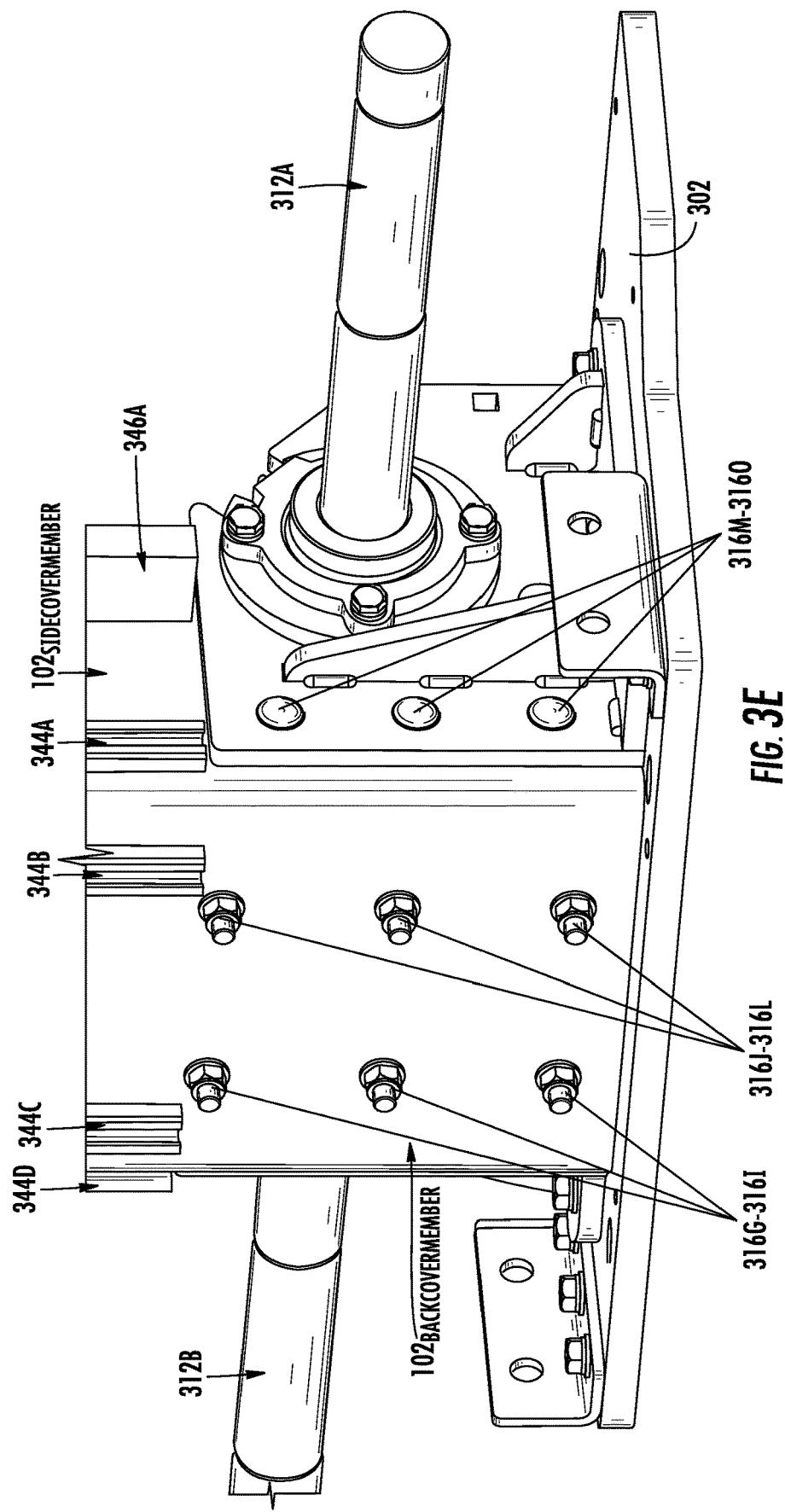

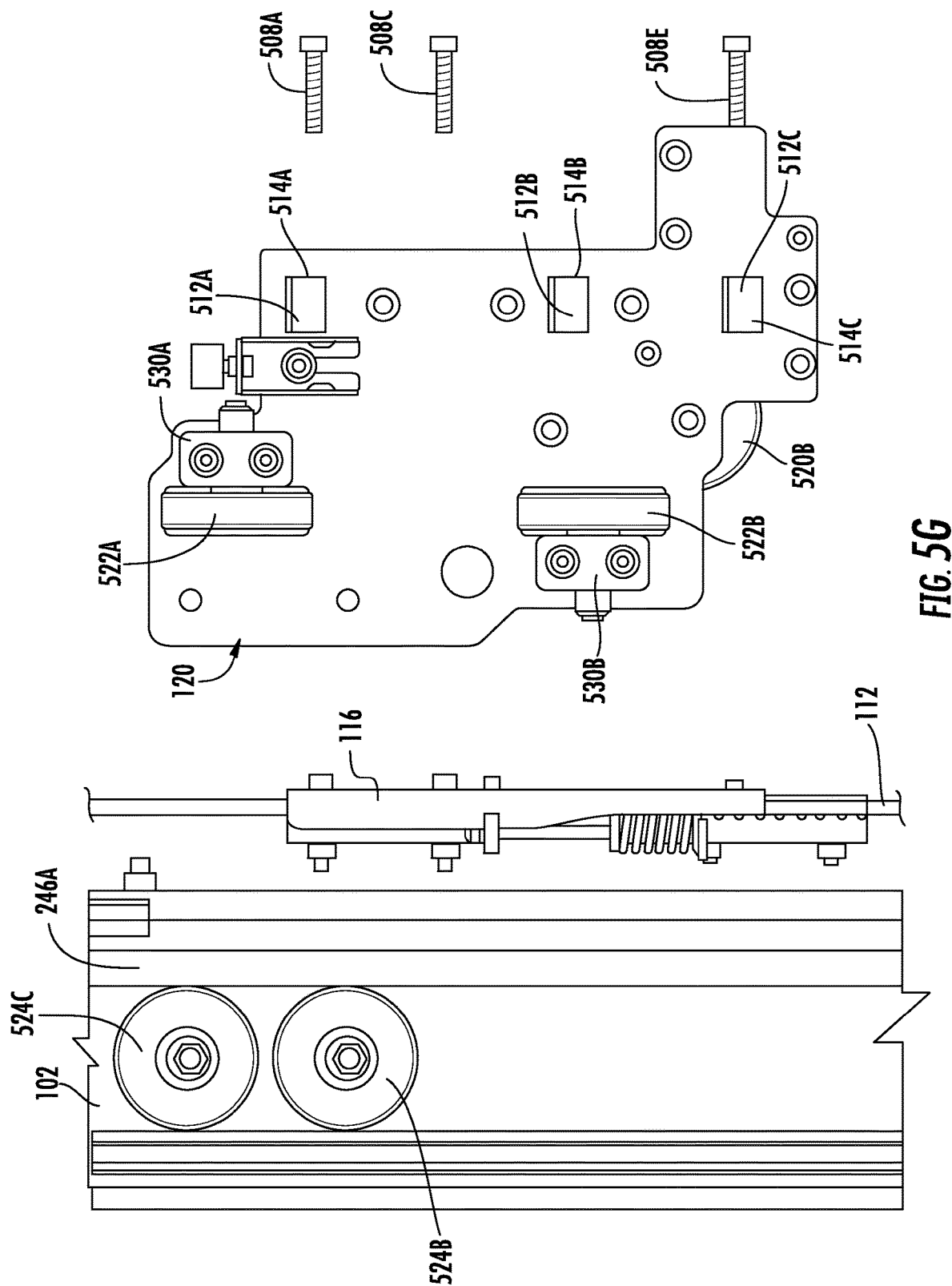

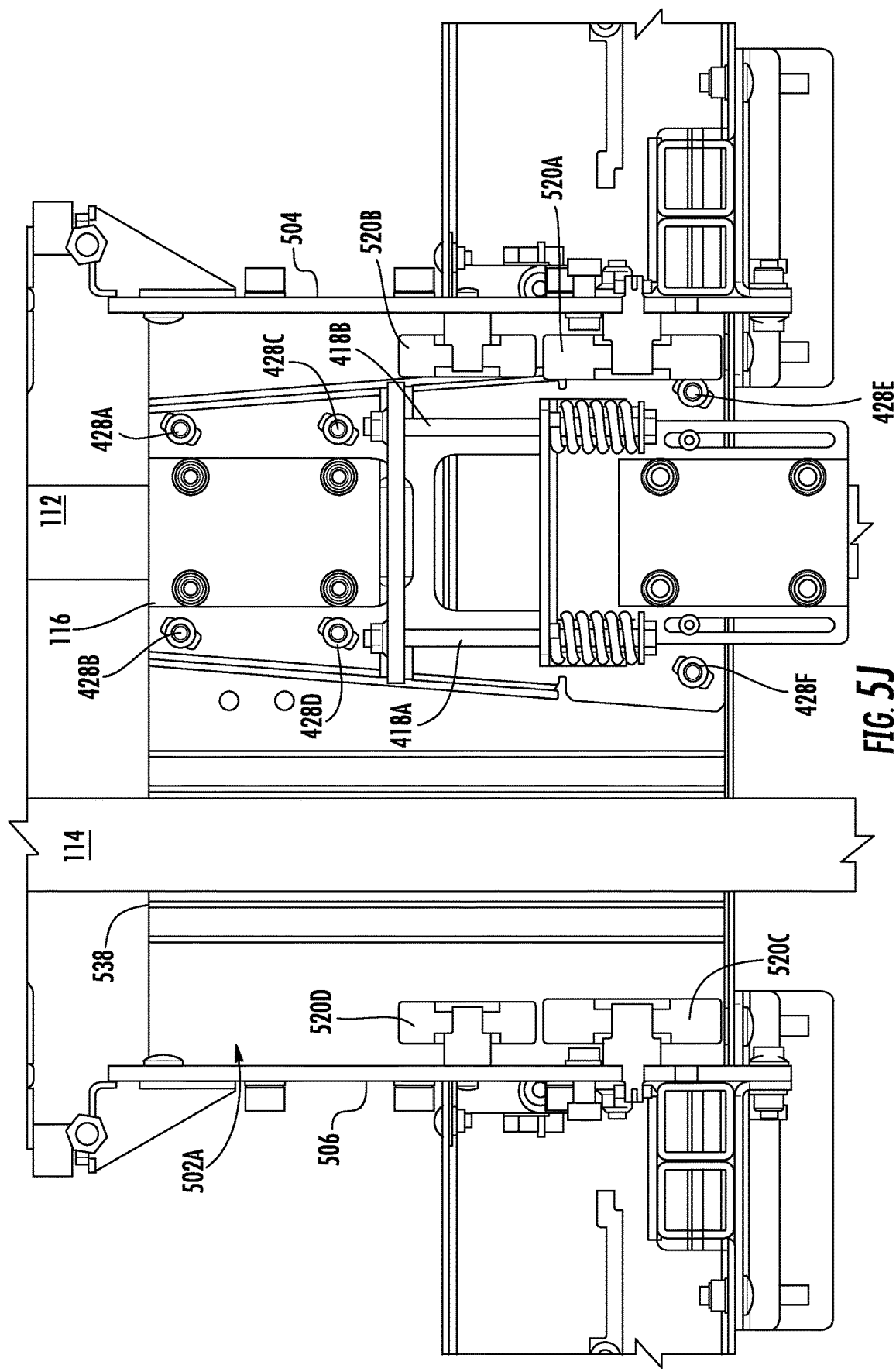

CARRIAGE LIFT ASSEMBLY FOR STORAGE HANDLING AND ARTICLE RETRIEVAL

TECHNOLOGICAL FIELD

Example embodiments of the present invention relate generally to material handling systems, and, more particularly, to carriage lift assemblies.

BACKGROUND

Automated Storage and Retrieval Systems (ASRS), such as ASRS product lifts, are used as material handling systems to facilitate movement of high volumes of articles and maximize the use of valuable storage space. ASRSs are key components in material handling environments by combining automation, software, and labor to optimize the productivity and throughput in a variety of operations. Furthermore, ASRSs provide flexibility and speed allowing use in applications ranging from e-commerce and omnichannel fulfillment to article distribution. Applicant has identified several technical challenges associated with ASRS product lifts. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented hereafter. The embodiments of the present disclosure relate to a carriage lift assembly for storage handling and retrieval of articles. According to at least one aspect of the present disclosure, a carriage lift assembly is provided. The carriage lift assembly may include a mast member, a top bearing assembly, a bottom bearing assembly, one or more belt members, one or more belt tensioner assemblies, and one or more carriage assemblies. The mast member defines two or more guiding members. The top bearing assembly is removably installed proximate a top section of the mast member. The top bearing assembly may comprise one or more sub-assemblies. The bottom bearing assembly is removably installed proximate a bottom section of the mast member. The bottom bearing assembly may comprise one or more sub-assemblies. One or more belt members, wherein each belt member is configured to mate with a pair of sprocket wheel members, wherein a first sprocket wheel member of the pair of sprocket wheel members corresponds to a first top bearing sub-assembly of the top bearing assembly, and wherein a second sprocket wheel member of the pair of sprocket wheel members correspond to a first bottom bearing sub-assembly of the bottom bearing assembly. The first sprocket wheel member and the second sprocket wheel member may be aligned along a length of the mast member.

One or more belt tensioner assemblies may be configured to provide tension in the one or more belt members, wherein a first belt tensioner assembly defines a first clamping block coupled with a top end of a tensioner plate, a second clamping block coupled with a bottom end of a slidable plate member engaged with a bottom end of the tensioner plate, and a pair of bolt members configured to engage the slidable plate member with the tensioner plate. The first clamping block and the second clamping block in the first belt tensioner assembly may be configured to secure a first and a second end of a belt member to provide an initial tension in the belt member. The pair of bolt members may be adjusted under an influence of an external force to move the slidable plate member along a longitudinal axis of the tensioner plate to provide a final tension in the belt member. In an embodiment, the first clamping block is fixed at a top end on a first surface of a tensioner plate of the first belt tensioner assembly, and the second clamping block is fixed on a slidable plate laterally abutting the first surface at a bottom end of the tensioner plate of the first belt tensioner assembly. A first end of the belt member is secured in the first clamping block of the first belt tensioner assembly, and a second end of the belt member is secured by the second clamping block of the first belt tensioner assembly. The second clamping block of the first belt tensioner assembly may further comprise a pair of bolt members, wherein the pair of bolt members is configured to engage a slidable plate member and adjust under an influence of an external force to move the slidable plate along a longitudinal axis of the first belt tensioner assembly.

One or more carriage assemblies may be removably attached to the one or more belt tensioner assemblies via the one or more guiding members. Each carriage assembly may define a center plate configured to be removably attached to the corresponding belt tensioner assembly, and two side plates. The two side plates may define a fixed set of guiding wheel members configured to receive a first set of guiding members on side walls of the mast member in an instance in which each carriage assembly is installed on the mast member. The two side plates may define a removable set of guiding wheel members configured to receive the two side plates and the first set of guiding members in an instance in which each carriage assembly is coupled to the mast member.

The carriage lift assembly may further comprise one or more shaft drives, wherein a first shaft drive of the one or more shaft drives is configured to drive a first bottom shaft member on which the second sprocket wheel member is installed in the first bottom bearing sub-assembly of the bottom bearing assembly.

According to another aspect of the present disclosure, a bearing assembly for use in a carriage lift assembly is disclosed. The bearing assembly comprises a base plate, one or more fixed plates, wherein each of the one or more fixed plates is configured to bolt to a back of a mast member, wherein a first fixed plate defines a first bore member configured to receive a first inner bearing member. A first side plate may be configured to be adjustably fixed at a side position of the mast member based on a width of the mast member, wherein the first side plate defines an open groove member configured to receive a first outer bearing member. At least a first sprocket wheel member installed on a first shaft member having the first inner bearing member and aligned within the first fixed plate and the first side plate, wherein alignment of the first sprocket wheel member is such that the bearing assembly is configured to attach to the mast member independent of the width of the mast member. The bearing assembly may be a top bearing assembly installed proximate a top section of the mast member, wherein the first shaft member is a first top shaft member in an instance in which the first top shaft member corresponds to a top bearing assembly, and wherein the first top shaft member is driven under an influence of a first belt member mating with corresponding sprocket wheels. The bearing assembly may be further a bottom bearing assembly installed proximate a bottom section of the mast member, wherein the first shaft member is a first bottom shaft member in an instance in which the first bottom shaft member corresponds to a bottom bearing assembly, wherein the first bottom shaft member is driven by a first shaft drive.

The first inner bearing member may be fixed at a first end of the first shaft member, and the first outer bearing member may be floating at a second end of the first shaft member. The first inner bearing may be attached with the first fixed plate, the first outer bearing member received by the open groove member may float on the first shaft member until the first side plate is bolted to the base plate, and the first outer bearing member may be attached with the first side plate when the first side plate is bolted to the base plate, and the first open groove member in the first side plate may be covered by a first covering plate when the first outer bearing member is attached with the first side plate.

In an embodiment, the first sprocket wheel member from each of a top bearing assembly and a bottom bearing assembly may be aligned along a length of the mast member and constitute a first set of sprocket wheels. The first set of sprocket members with which the first belt member mates may be fixed at a first distance from the first fixed plate, and a distance between the first fixed plate and the first side plate is within a defined tolerance level and independent of the first distance.

In an embodiment, the base plate may comprise a plurality of slot members configured to receive protruding members of the first side plate upon mounting. The first side plate may be configured to be adjusted by loosening a plurality of bolting members and moving the first side plate inwards or outwards along a longitudinal axis of the base plate based on the width of the mast member. A movement of the first side plate inwards or outwards along the longitudinal axis of the base plate based on the width of the mast member is limited by clearances provided by the plurality of slot members.

According to another aspect of the present disclosure, a belt tensioner assembly for use in a carriage lift assembly is disclosed. The belt tensioner assembly may comprise a tensioner plate having a first surface and a second surface, a first clamping block laterally abutting the first surface and coupled with a top end of the tensioner plate, wherein the first clamping block is operable to secure a first end of a belt member, a slidable plate member laterally abutting the first surface at a bottom end of the tensioner plate, wherein the slidable plate member is operable to slide along a longitudinal axis of the tensioner plate, a second clamping block laterally abutting the slidable plate member and coupled with a bottom end of the slidable plate member, wherein the second clamping block is operable to secure a second end of a belt member, and wherein the first clamping block and the second clamping block are configured to provide an initial tension in the belt member, and a pair of bolt members configured to couple the slidable plate member with a fixed plate member located horizontally on the first surface, wherein the pair of bolt members are adjusted under an influence of an external force to move the slidable plate member along the longitudinal axis of the tensioner plate, and wherein the pair of bolt members is configured to provide a final tension in the belt member.

In an embodiment, the belt tensioner assembly may be configured to maintain the initial tension in the belt member in an instance in which a carriage assembly is removed from the belt tensioner assembly, wherein the initial tension is provided by the belt tensioner assembly in the belt member prior to attachment with a carriage assembly. The belt tensioner assembly may include a plurality of features on the second surface for suitably coupling a center plate of a carriage assembly with the second surface of the belt tensioner assembly. The adjustment of the pair of bolt members corresponds to tightening of the pair of bolt members until corresponding spring members are compressed to a specific amount.

According to another aspect of the present disclosure, a carriage assembly for use in a carriage lift assembly is disclosed. The carriage assembly may comprise a center plate configured to be removably attached to a belt tensioner assembly at a first lateral surface via a plurality of bolting members; and two side plates defining a fixed set of guiding wheel members configured to receive a first set of guiding members on side walls of a mast member in an instance in which the carriage assembly is installed on the mast member and a removable set of the plurality of guiding wheel members configured to receive the two side plates and the first set of guiding members in an instance in which the carriage assembly is coupled to the mast member. The removable set of the plurality of guiding wheel members are removable from the two side plates when the carriage assembly is to be removed from the mast member. In an embodiment, a second lateral surface of the center plate is engaged with a belt cartridge.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 2A-2I illustrate views of a top bearing assembly of a carriage lift assembly in the material handling system of FIG. 1 according to one or more embodiments of the present disclosure;

FIGS. 3A-3E illustrate views of a bottom bearing assembly of the carriage lift assembly in the material handling system of FIG. 1 according to one or more embodiments of the present disclosure;

FIGS. 5A-5J illustrate views of a first carriage assembly of the carriage lift assembly in the material handling system of FIG. 1 according to one or more embodiments of the present disclosure.

DETAILED DESCRIPTION

Figure 1:
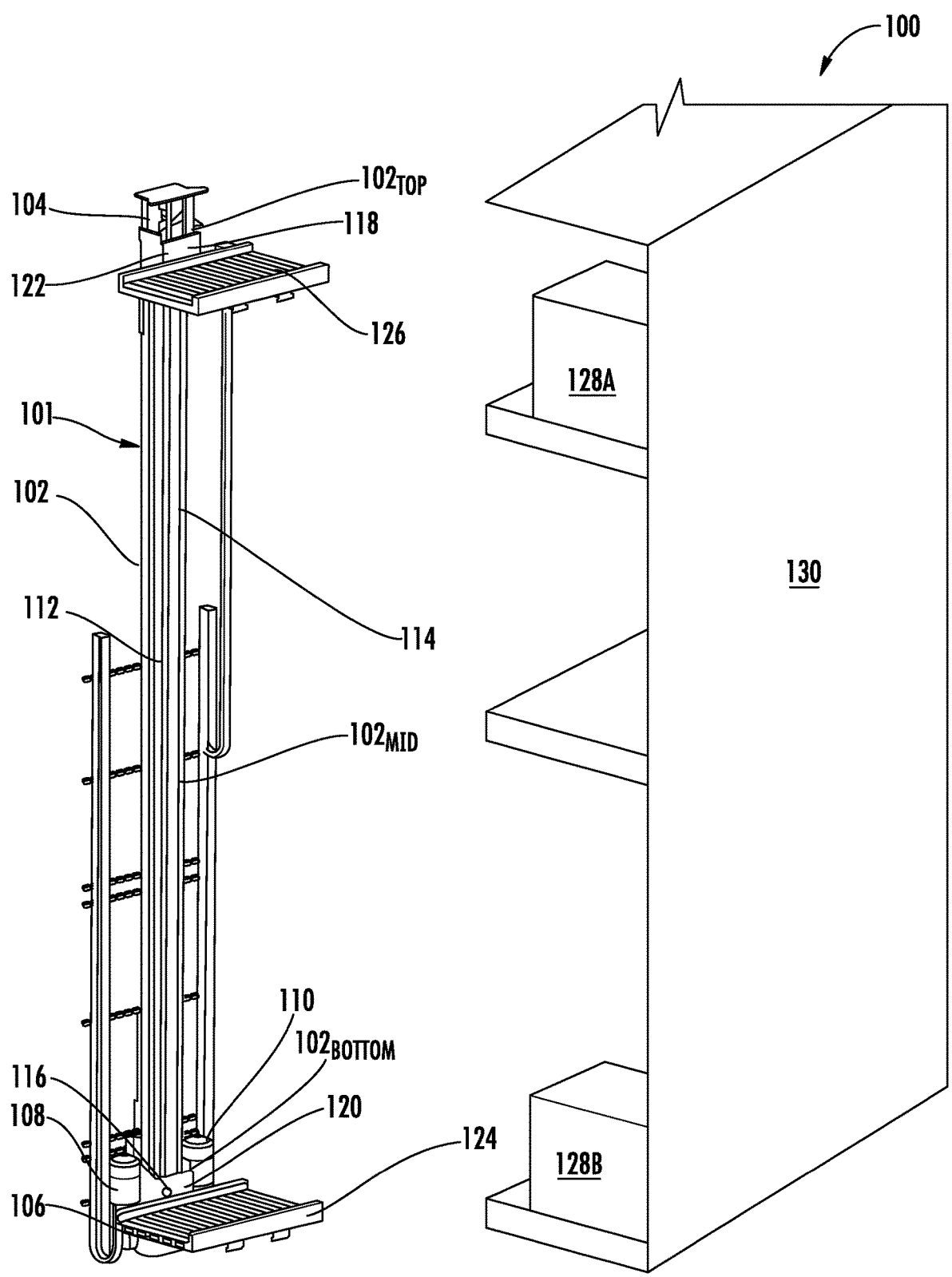
FIG. 1 illustrates a perspective view of a material handling system 100 according to one or more embodiments of the present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention. The detailed description set forth below in connection with the appended drawings is further intended as a description of various configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art that these concepts may be practiced without these specific details.

As described and illustrated herein, various embodiments, configurations, components, features, and the like are shown and described in conjunction with a carriage lift assembly that includes two carriages (e.g., carriage assemblies). As would be evident to one of ordinary skill in the art in light of the present disclosure, any number of carriage assemblies may be used in conjunction with the embodiments of the present invention. Said differently, while described hereafter with reference to two carriage assemblies, the present disclosure contemplates carriage lift assemblies that utilize only a single carriage assembly, belt tensioner, bearing assembly, and the like as well as carriage lift assemblies employing numerous carriage assemblies, belt tensioners, bearing assemblies, and the like, without limitation.

Existing ASRS product lifts typically utilizes one or more carriages that move along the length of the entire lift member. Such ASRS product lifts use a pair of pillow block type bearings on the top of mast member of the lift to accommodate masts of a set width (e.g., with little variability). Further, in such systems, the carriage and the tensioner are welded to each other such that the tensioner cannot be removed from the ASRS. The guiding wheels are also fixed to the carriage such that the carriage cannot be easily removed. Such a fixed arrangement of various parts introduces various inefficiencies during handling and maintenance of the ASRS product lift. In certain systems, the side plates of the carriage must be removed in order to remove the carriage from the mast. Also, the belt must be de-tensioned and removed from the clamp plates of the belt tensioner assembly that were attached to the center plate. In this way, the belt tends to lose tension which proves to be difficult and time consuming when assembling a new carriage assembly. Therefore, such non-modular arrangement of various components introduces various challenges during operation and maintenance. For example, if there is any defect in the carriage, the whole system stands inoperable, and the extended downtime affects the productivity in the facility.

FIG. 1 illustrates a perspective view of a material handling system 100 in accordance with one or more embodiments of the present disclosure. The material handling system 100 may include a carriage lift assembly 101 that may include various parts and/or assemblies, such as a mast member 102, a top bearing assembly 104, a bottom bearing assembly 106, a first shaft drive 108, a second shaft drive 110, a first belt member 112, a second belt member 114, a first belt tensioner assembly 116, a second belt tensioner assembly 118, a first carriage assembly 120, a second carriage assembly 122, a first belt cartridge 124, and a second belt cartridge 126.

As shown in the embodiment illustrated in FIG. 1, there are two instances of various parts and/or assemblies, such as the top bearing assembly 104 and the bottom bearing assembly 106, the first shaft drive 108 and the second shaft drive 110, the first belt member 112 and the second belt member 114, the first belt tensioner assembly 116 and the second belt tensioner assembly 118, the first carriage assembly 120 and the second carriage assembly 122, and the first belt cartridge 124 and the second belt cartridge 126. However, the present disclosure contemplates that any number of such various parts and/or assemblies may be included without deviating from the scope of the present disclosure.

In addition to the carriage lift assembly 101, the material handling system 100 may further include a variety of components and/or subsystems, such as, but not limited to, induction conveyors, sortation systems, chutes, identification systems, vision systems, robotic subsystems, and the like, for handling and processing the articles, not shown here for the sake of clarity of description. For example, the vision system may have one or more sensors positioned at predetermined locations within the material handling system 100 to generate inputs corresponding to one or more characteristics of the articles 128A and 128B. Such a vision system may be implemented using a standalone camera or a network of imagers, sensors, cameras, identification systems, and the like for determining characteristics of the articles being handled by the material handling system 100. In accordance with various embodiments of the present disclosure, the characteristics of the articles 128A and 128B may include, but is not limited to, size, weight, position, edge detection, marker and/or label detection, and the like. The characteristics of the articles 128A and 128B may be used to control one or more parts, drives, motors, and/or assemblies of the material handling system 100. The material handling system 100 may further include a control unit (not shown) in communication with the one or more parts, drives, motors, and/or assemblies of the material handling system 100. The control unit may include at least one processor that may execute instructions to cause the material handling system 100 to perform specific operations. In accordance with the embodiments of the present disclosure, a processor, in conjunction with the control unit, may execute instructions to cause the vision system to determine orientation, position, and location of the articles 128A and 128B to be conveyed.

The mast member 102 may be the base frame of the carriage lift assembly 101 having a top section $102_{Top}$, a mid section $102_{Mid}$, and a bottom section $102_{Bottom}$. At the top section $102_{Top}$ of the mast member 102, there may be installed the top bearing assembly 104. At the mid section $102_{Mid}$ of the mast member 102, there are provided vertical guiding rails and members. The first belt member 112 and the second belt member 114 may be secured by the first belt tensioner assembly 116 and the second belt tensioner assembly 118 so as to mate with the top bearing assembly 104 and the bottom bearing assembly 106. This allows for the first carriage assembly 120 and the second carriage assembly 122 to travel along the length of the mast member 102. At the bottom section $102_{Bottom}$ of the mast member 102, there may be installed the bottom bearing assembly 106, the first shaft drive 108, the second shaft drive 110, and corresponding electrical assemblies.

The structure and weight of the mast member 102 should be such that the mast member 102 is stably held when the first carriage assembly 120 and the second carriage assembly 122 travel along the vertical guides installed along the mid section $102_{Mid}$ of the mast member 102. In some embodiments, the various assemblies are modular to enable the carriage lift assembly 101 to be quickly and reliably assembled and disassembled for ease of transport. The modular system also allows various components to be used on different types of mast and base designs, increasing versatility of the carriage lift assembly 101.

The top bearing assembly 104 and the bottom bearing assembly 106 may correspond to an arrangement of various members, such as inner rings, outer rings, ball bearings, and metal body, for securement to corresponding shaft members, as further described in FIGS. 2A-2I and FIGS. 3A-3E, respectively. The top bearing assembly 104 may be installed proximate the top section $102_{Top}$ of the mast member 102 and the bottom bearing assembly 106 may be installed proximate the bottom section $102_{Bottom}$ of the mast member 102. Each of the top bearing assembly 104 and the bottom bearing assembly 106 may include a pair of sprocket wheel members such that each sprocket member is rotatably arranged in a corresponding sub-assembly. A sprocket member rotatably arranged in a corresponding sub-assembly of the top bearing assembly 104 and corresponding sprocket member rotatably arranged in a corresponding sub-assembly of the bottom bearing assembly 106 may be vertically aligned with respect to each other along a single line of length and may be referred to as a sprocket set. With continued reference to FIG. 1, two sets of sprocket wheel members corresponding to the top bearing assembly 104 and the bottom bearing assembly 106 are illustrated. However, in alternative embodiments, more than two sets of sprocket wheel members corresponding to the top bearing assembly 104 and the bottom bearing assembly 106 may be used. Further structural details of the top bearing assembly 104 and the bottom bearing assembly 106 are described in detail in FIGS. 2A-2I and FIGS. 3A-3E, respectively.

The first shaft drive 108 and the second shaft drive 110 may be electrical motors installed at the bottom section $102_{Bottom}$ of the mast member 102. The first shaft drive 108 and the second shaft drive 110 may be electrically connected with the sub-assemblies of the bottom bearing assembly 106 to drive the bottom bearing assembly 106 under the control of the control unit. The first shaft drive 108 and the second shaft drive 110 may correspond to shaft motors that are direct drive linear servo motors. Such servo motors may consist of shaft members with laminated magnets and cylindrically wound coils controlled by the flow of current. Such energized shaft members may be adjusted at least in the bottom bearing assembly 106 for driving the first belt member 112 and the second belt member 114 along the mid section $102_{Mid}$ of the mast member 102.

The first belt member 112 and the second belt member 114 may mate with the sets of sprocket wheel members rotatably engaged in the sub-assemblies of the top bearing assembly 104 and the bottom bearing assembly 106. Specifically, the first belt member 112 is vertically positioned along one side the mid section $102_{Mid}$ of the mast member 102 that mates with a first sprocket wheel member of a first sub-assembly of the top bearing assembly 104 and a corresponding vertically aligned first sprocket wheel member of a first sub-assembly of the bottom bearing assembly 106. Similarly, the second belt member 114 is vertically positioned along the mid section $102_{Mid}$ of the mast member 102 between a second sprocket wheel member of a second sub-assembly of the top bearing assembly 104 and a corresponding vertically aligned second sprocket wheel member of a second sub-assembly of the bottom bearing assembly 106.

Two ends of each of the first belt member 112 and the second belt member 114 may be secured by two opposite clamping blocks in corresponding belt tensioner assembly. For example, opposite ends of the first belt member 112 are secured by opposite clamping blocks in the first belt tensioner assembly 116. Similarly, opposite ends of the second belt member 114 are secured by opposite clamping blocks in the second belt tensioner assembly 118. Appropriate initial tension may be provided in the first belt member 112 and the second belt member 114 by the first belt tensioner assembly 116 and the second belt tensioner assembly 118, respectively, in the manufacturing facility. Final tension may be provided in the first belt member 112 and the second belt member 114 by the first belt tensioner assembly 116 and the second belt tensioner assembly 118, respectively, in the operating facility or the field.

The belt body of the first belt member 112 and the second belt member 114 may be made of an elastic and wear-resistant material, preferably an elastic plastic, for example, polyurethane (PU) or ethylene-propylene terpolymer (EPDM). In certain embodiments, laterally directed guiding forces may be induced in the first belt member 112 and the second belt member 114 during operation. In order to absorb such forces and reduce coefficient of friction, an additive, such as silicone, polyethylene, or cotton fibers, may be added to the elastic material of the belt body.

The first belt tensioner assembly 116 and the second belt tensioner assembly 118 may correspond to mechanical assemblies that may be used to secure opposite ends of the first belt member 112 and the second belt member 114, respectively. Specifically, each of the first belt tensioner assembly 116 and the second belt tensioner assembly 118 include two opposite clamping units. One clamping unit may be directly coupled to a tensioner plate of corresponding belt tensioner assembly. Another clamping unit may be coupled at a slidable plate that may be further coupled with the tensioner plate of the corresponding belt tensioner assembly. In an example embodiment, opposite ends of each belt member are secured in corresponding clamping units in corresponding belt tensioner assemblies to provide an appropriate initial tension in a corresponding belt member in the manufacturing facility. In another embodiment, the slidable plate of corresponding belt tensioner assembly may be adjusted to provide a final tension in a corresponding belt member in the operating facility or the field. Further structural details of the first belt tensioner assembly 116 and the second belt tensioner assembly 118 are described in detail in FIGS. 4A-4B.

In an embodiment, the slidable plate is coupled with the tensioner plate of the corresponding belt tensioner assembly via nut and bolt members and biasing members, such as spring members, disposed thereon such that in an instance in which there is slack in the corresponding belt member, the spring members may decompress to accommodate for the slack and ensure that the corresponding belt member is always tensioned. Said differently, the spring members initially ensure that the corresponding belt member is tensioned properly when the nut and bolt members are tightened until the spring members are compressed to a certain amount. The respective spring members continuously maintain the tension on the corresponding belt member while the corresponding carriage assembly travels along the mid section $102_{Mid}$ of the mast member 102. When the carriage assembly travels in the downward direction, the spring members account for any slack in the corresponding belt member, thereby compensating for any stretch in the corresponding belt members.

The first carriage assembly 120 and the second carriage assembly 122 may correspond to mechanical assemblies that may be configured to be removably attached to the first belt tensioner assembly 116 and the second belt tensioner assembly 118, respectively. Each of the first carriage assembly 120 and the second carriage assembly 122 include a plurality of guiding wheel members. At least a first set of the plurality of guiding wheel members may be received at the mid section $102_{Mid}$ of the mast member 102 when the corresponding carriage assembly is installed on the mid section $102_{Mid}$ of the mast member 102. Conversely, the first set of the plurality of guiding wheel members may be removed when the corresponding carriage assembly is removed from the mid section $102_{Mid}$ of the mast member 102. Further structural details of the first carriage assembly 120 and the second carriage assembly 122 are described in detail with reference to FIGS. 5A-5J.

As the clamping units are attached to a tensioning plate in a belt tensioner assembly, the corresponding belt member may be tensioned without the presence of a corresponding carriage assembly. This may provide an initial tension in the belt member in the manufacturing facility and such that the belt member may be shipped to an operating location with the initial tension. Further, if maintenance requires removal of the corresponding carriage assembly, the tension in corresponding belt member may not be released. This may allow for easier and quicker maintenance by ensuring that the belt member is always suitably tensioned.

The first belt cartridge 124 and the second belt cartridge 126 may correspond to mechanical assemblies that define a respective conveying surface configured to convey articles disposed thereon. In an example embodiment, the first belt cartridge 124, under the control of the control unit, may be configured to direct articles in a first conveying direction, also referred to as the infeed direction. In another example embodiment, the second belt cartridge 126, under the control of the control unit, may be configured to selectively discharge articles therefrom in a second conveying direction, also referred to as the outfeed direction that is transverse to the first direction.

Thus, the carriage lift assembly 101, as disclosed in one or more embodiments of the present disclosure, facilitates usage of multiple carriage assemblies, such as the first carriage assembly 120 and the second carriage assembly 122, that move independently with respect to each other, along the length of the entire mast member 102 on different belt members. Due to the multiple carriage assemblies, such as the first carriage assembly 120 and the second carriage assembly 122, and multiple shafts, such as the first shaft drive 108 and the second shaft drive 110, the carriage lift assembly 101 provides improved efficiency. By different carriage assemblies traveling different portions of length of the mast member 102 storage and retrieval of articles may be more easily accomplished. In an example embodiment, one carriage assembly, such as the first carriage assembly 120, may be operable under the control of a control system and a shaft drive, such as the first shaft drive 108, to move from the top to the other carriage's position. Similarly, the other carriage assembly, such as the second carriage assembly 122, is operable under the control of the control system and another shaft drive, such as the second shaft drive 110, to move from the bottom to the other carriage's position. Thus, the two carriage assemblies are free to move in their designated line of lengths, as long as the other carriage is not in path of travel, thereby allowing the carriage lift assembly 101 to execute storage and retrieval tasks in an efficient manner.

In some embodiments, the first carriage assembly 120 may travel along an upper portion of the length of the mast member 102, and the second carriage assembly 122 may travel along a lower portion of the length of the mast member 102 in a parallel manner. The top bearing assembly 104 and the bottom bearing assembly 106 are adjustable according to the width of the mast member 102 upon which they are mounted. This adjustability allows the top bearing assembly 104 and the bottom bearing assembly 106 to accommodate any mast width within a specified tolerance of the mast member 102. Thus, the top bearing assembly 104 and the bottom bearing assembly 106 do not have to be customized for each mast member 102.

Further, in such systems, the carriage assemblies, such as the first carriage assembly 120 and the second carriage assembly 122, and the tensioner assemblies, such as the first belt tensioner assembly 116 and the second belt tensioner assembly 118, are not welded to each other permanently. By way of example, in the carriage lift assembly 101, the carriage assemblies, such as the first carriage assembly 120 and the second carriage assembly 122, and the tensioner assemblies, such as the first belt tensioner assembly 116 and the second belt tensioner assembly 118, are removably attached to one another. Thus, the tensioner assemblies may be easily removed from the carriage assemblies.

Further, a set of the guiding wheel members of the carriage assemblies is removable. Such a removable arrangement of various parts introduces various efficiencies during handling and maintenance of the carriage lift assembly 101. Said differently, the removable carriage assemblies may be mounted to or removed from the mast member 102 without taking the carriage assemblies apart and without having to release the tension in the belt members. Only four guide wheel members are required to be removed from each of the carriage assemblies so that the carriage assemblies can be mounted to the mast member 102. Similarly, in order to remove the carriage assemblies from the mast member 102, the four guide wheel members are removed in a similar manner, such that the carriage assemblies are removed from the mast member 102. This features allows for simple attachment and detachment of the carriage assemblies from the mast member 102. Furthermore, this configuration also allows for the carriage assemblies to be assembled in the field rather than in the manufacturing facility. In some example embodiments, unlike existing systems, the side plates of the carriage assemblies may not be required to be removed in order to remove the carriage assemblies from the mast member 102 in the carriage lift assembly 101.

The belt tensioner assemblies of the present application are configured to provide tension in the belt members without being attached to the carriage assemblies such that the proposed belt tensioner assemblies allow the mast member 102 to be shipped with the belt already installed and set to the proper tension. In this way, if the carriage assemblies need to be removed, the belt members do not need to be de-tensioned and/or removed. Furthermore, the belt members do not need to be removed for preventive maintenance tasks. Given that the belt tension is achieved by the springs, as the belt wears the springs apply a force to the belt to minimize any belt stretch.

When the mast member 102 arrives in the field, the carriage assemblies may be easily attached to the belt tensioner assemblies using bolts through the center plates of the carriage assemblies once the mast member 102 is installed upright. The bolts (e.g., six (6) bolts as shown) on each of the belt tensioner assembles hold the tensioning plate of the corresponding belt tensioner assembly to the center plate of the corresponding carriage assembly and ensure that it is positioned correctly relative the center plate. Once fixed in place, the tension in the belt members may be adjusted using bolts accessible from underneath the carriage. In this way, nothing needs to be removed to adjust the belt tension, and the belt members may be tensioned without attachment to the respective carriage assemblies. Thus, the carriage lift assembly 101 described herein introduces various assemblies that are removable from the carriage lift assembly 101 to facilitate system handling, decrease downtime, facilitate future design adjustments, increase efficiency, and enhance the productivity in the facility.

FIGS. 2A-2I illustrate views of the top bearing assembly 104 of the carriage lift assembly 101 in the material handling system 100, as shown in FIG. 1, in accordance with one or more embodiments of the present disclosure. As described in FIG. 1, the top bearing assembly 104 may be installed proximate the top section $102_{Top}$ of the mast member 102 of the carriage lift assembly 101.

With reference to FIGS. 2A-2I, the top bearing assembly 104 may include two sub-assemblies: a first top bearing sub-assembly 104A and a second top bearing sub-assembly 104B. The top bearing assembly 104 may further include a base plate 202, fixed plates 204A and 204B, a plurality of weldments 204W, fixed plate protruding members 205A-205F, two side plates 206A and 206B, side plate protruding members 207A-207D, a first set of inner bearing members 208A and 208B, a first set of outer bearing members 210A and 210B, a first top shaft member 212A, a second top shaft member 212B, a first sprocket wheel member 214A, a second sprocket wheel member 214B, a plurality of top nut and bolt members 216A-216F, a plurality of rear nut and bolt members 216G-216J, a front nut and bolt member 216K, a plurality of side nut and bolt members 216L-216Q, a plurality of cover plate nut and bolt members 216R-216Y, a first bore 218A, a second bore 218B, a first open groove member 220A, a second open groove member 220B, a first covering plate 222A, and a second covering plate 222B. The base plate 202 may further include tolerance adjustment slot members 224A-224D, fastening slot members 226A-226F, center plate protrusion receptacles 228A-228D, and back plate protrusion receptacles 228E and 228F. The top bearing assembly 104 may further include a supporting member 230, a front nut and bolt member 232, a back plate 234, back plate protruding members 235A-235D, mast coupling slot members 236A-236D, and back plate slot members 238A and 238B. There is further shown bearing bolt members 240A and 240B.

Figure 2A:
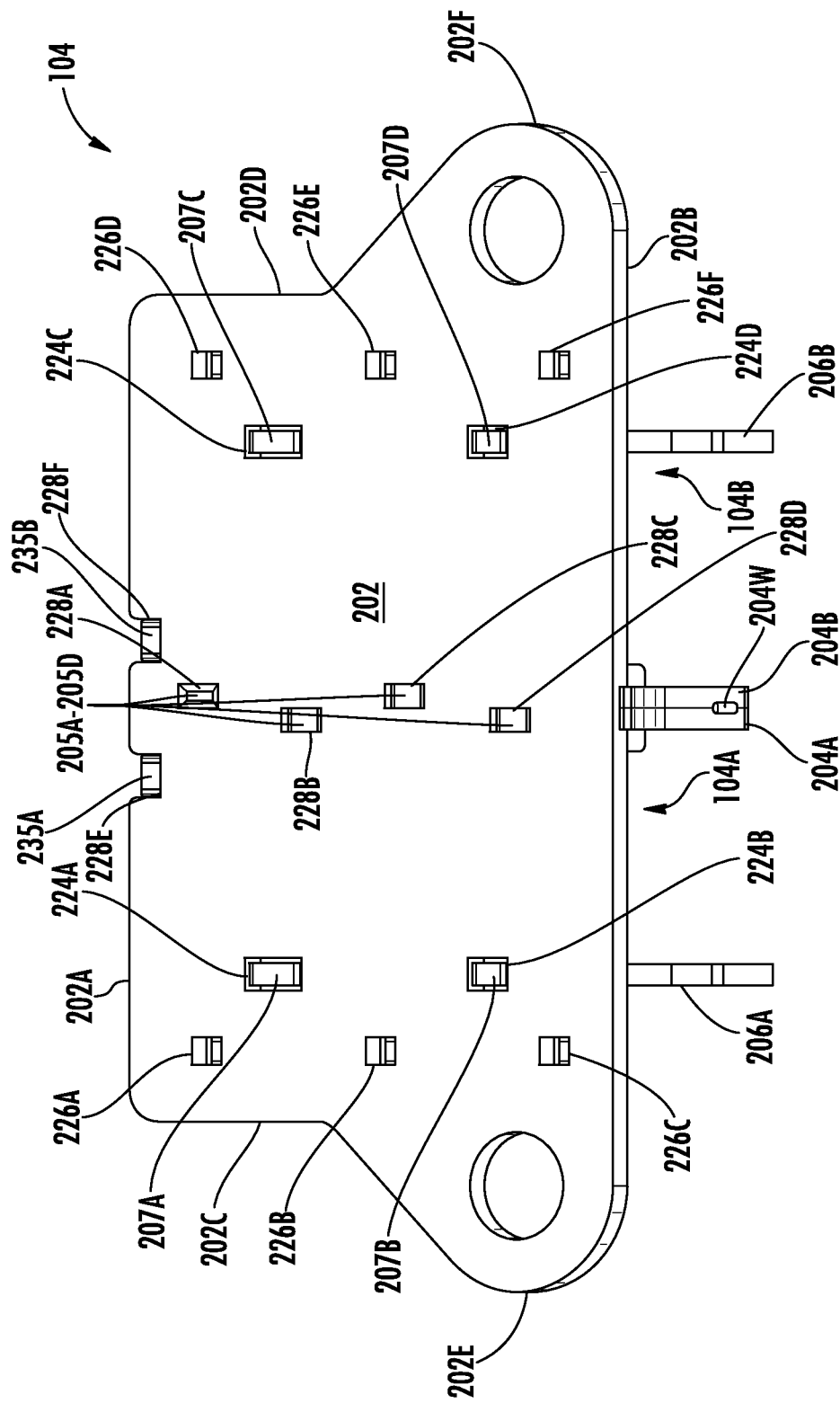

Referring to FIG. 2A, a top view of the base plate 202 of the top bearing assembly 104 is illustrated. The base plate 202 may, in some embodiments, be formed as a trapezoidal shape having two parallel longitudinal edges 202A and 202B. With respect to the front view of the carriage lift assembly 101, the longitudinal edge 202A is a distal edge and the longitudinal edge 202A is a proximal edge with longer length as compared to the longitudinal edge 202A. The left side edge of the base plate 202 may be defined as a combination of edge portions 202C and 202E, with the edge portion 202C orthogonal to longitudinal edge 202A and the edge portion 202E formed as a winged shape merging with the longitudinal edge 202B. Similarly, the right side edge of the base plate 202 may be defined as a combination of edge portions 202D and 202F, with the edge portion 202D orthogonal to longitudinal edge 202A and the edge portion 202F formed as a winged shape merging with the longitudinal edge 202B.

The base plate 202 has the tolerance adjustment slot members 224A-224D positioned in such a manner such that the slot members 224A and 224C are proximate the longitudinal edge 202A, and slot members 224B and 224D are proximate the longitudinal edge 202B. The slot members 224A and 224B are aligned in a linear pattern that is orthogonal to the longitudinal edges 202A and 202B at a first defined distance from the edge portions 202C and 202E, respectively. Similarly, the slot member 224C and the slot member 224D are aligned in a linear manner orthogonal to the longitudinal edges 202A and 202B at the first defined distance from the edge portions 202D and 202F, respectively.

The tolerance adjustment slot members 224A-224D may be configured to receive the side plates protruding members 207A-207D of the two side plates 206A and 206B when the two side plates 206A and 206B are coupled with the base plate 202. The center plate protrusion receptacles 228A-228D may be configured to receive center plate protruding members 205A-205D of the fixed plates 204A and 204B when the fixed plates 204A and 204B are coupled with the base plate 202. Further, two back plate protrusion receptacles 228E and 228F, positioned along the longitudinal edge 202A proximate the center plate protruding member 205A may be configured to receive the back plate protruding members 235A and 235B when the back plate 234 is coupled with the base plate 202.

The tolerance adjustment slot members 224A-224D may provide a defined space for adjusting each of the two side plates 206A and 206B by moving the two side plates 206A and 206B along the longitudinal edges 202A and 202B. The adjustment of the two side plates 206A and 206B may be based on a width of the mast member 102. In an example embodiment, the dimensions of the two tolerance adjustment slot members 224A and 224B (and the side plate protruding members 207A and 207C) may be similar relative to each other. Also, the dimensions of other two tolerance adjustment slot members 224B and 224D (and the side plate protruding members 207B and 207D) may be similar relative to each other.

The fastening slot members 226A-226C may be aligned in a linear pattern that is orthogonal to the longitudinal edges 202A and 202B at a second defined distance from the edge portions 202C and 202E. Similarly, the fastening slot members 226D-226F may be aligned in a linear pattern that is orthogonal to the longitudinal edges 202A and 202B at the second defined distance from the edge portions 202D and 202F. The second defined distance may be less than the first defined distance.

The fastening slot members 226A-226F of the base plate 202 may be overlapped with the slot members in the horizontal portion of the two side plates 206A and 206B (not shown). The overlapped slot members of the base plate 202 and the side plates 206A and 206B may be configured to receive the plurality of top nut and bolt members 216A-216F (shown in FIG. 2D) to couple the base plate 202 with the two side plates 206A and 206B. In an example embodiment, the plurality of top nut and bolt members 216A-216F may be loosened such that the two side plates 206A and 206B may further slide in or out depending on the width of the mast member 102. In some embodiments, the width of the mast member 102 may be eleven (11) inches. In such a case, the two side plates 206A and 206B may slide in and, once adjusted, may couple with the base plate 202 using the plurality of top nut and bolt members 216A-216F via the fastening slot members 226A-226F. In other embodiments, the width of the mast member 102 may be 12.10 inches. In such a case, the two side plates 206A and 206B may slide out and, once adjusted may couple with the base plate 202 using the plurality of top nut and bolt members 216A-216F via the fastening slot members 226A-226F.

Figure 2B:
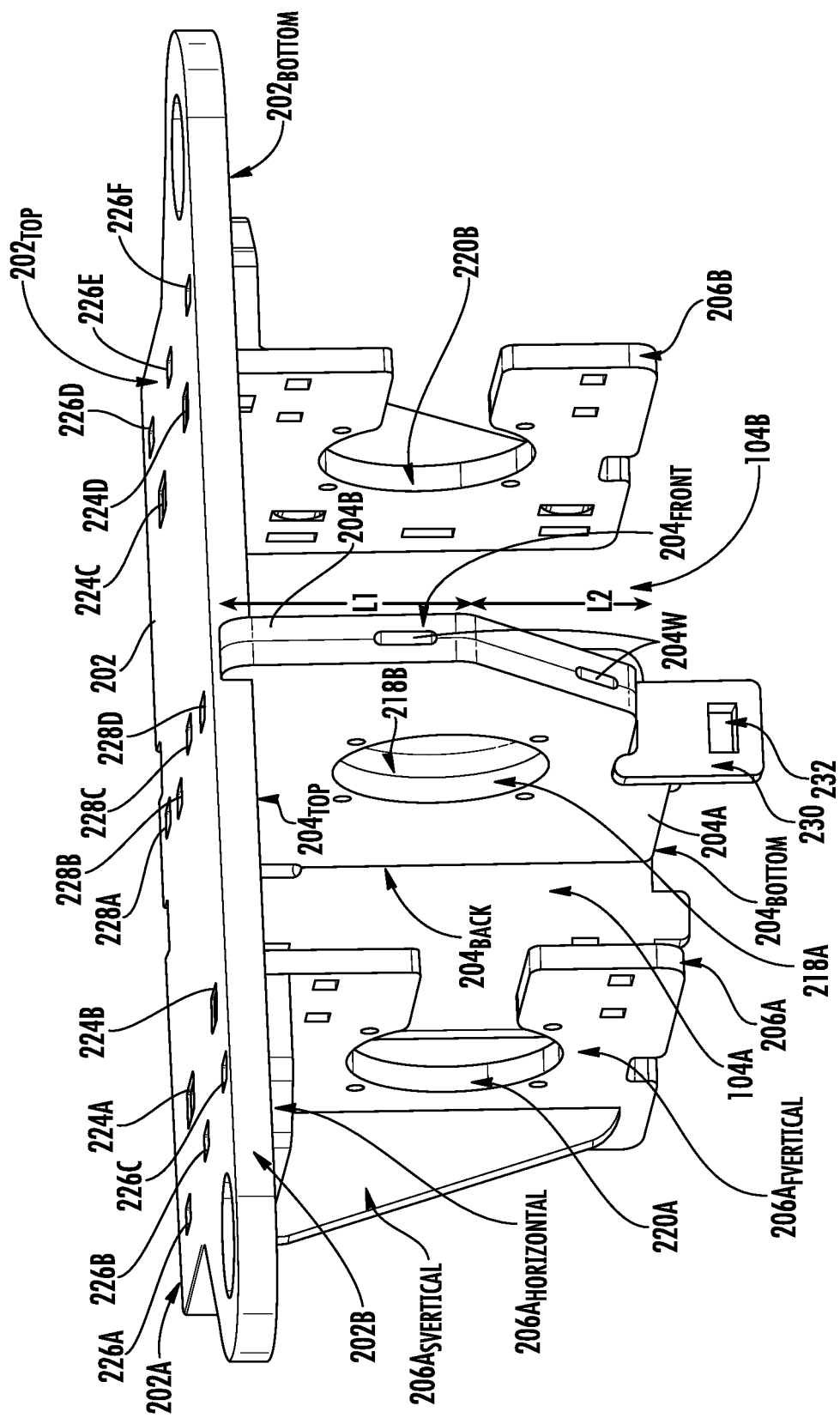
Figure 2C:
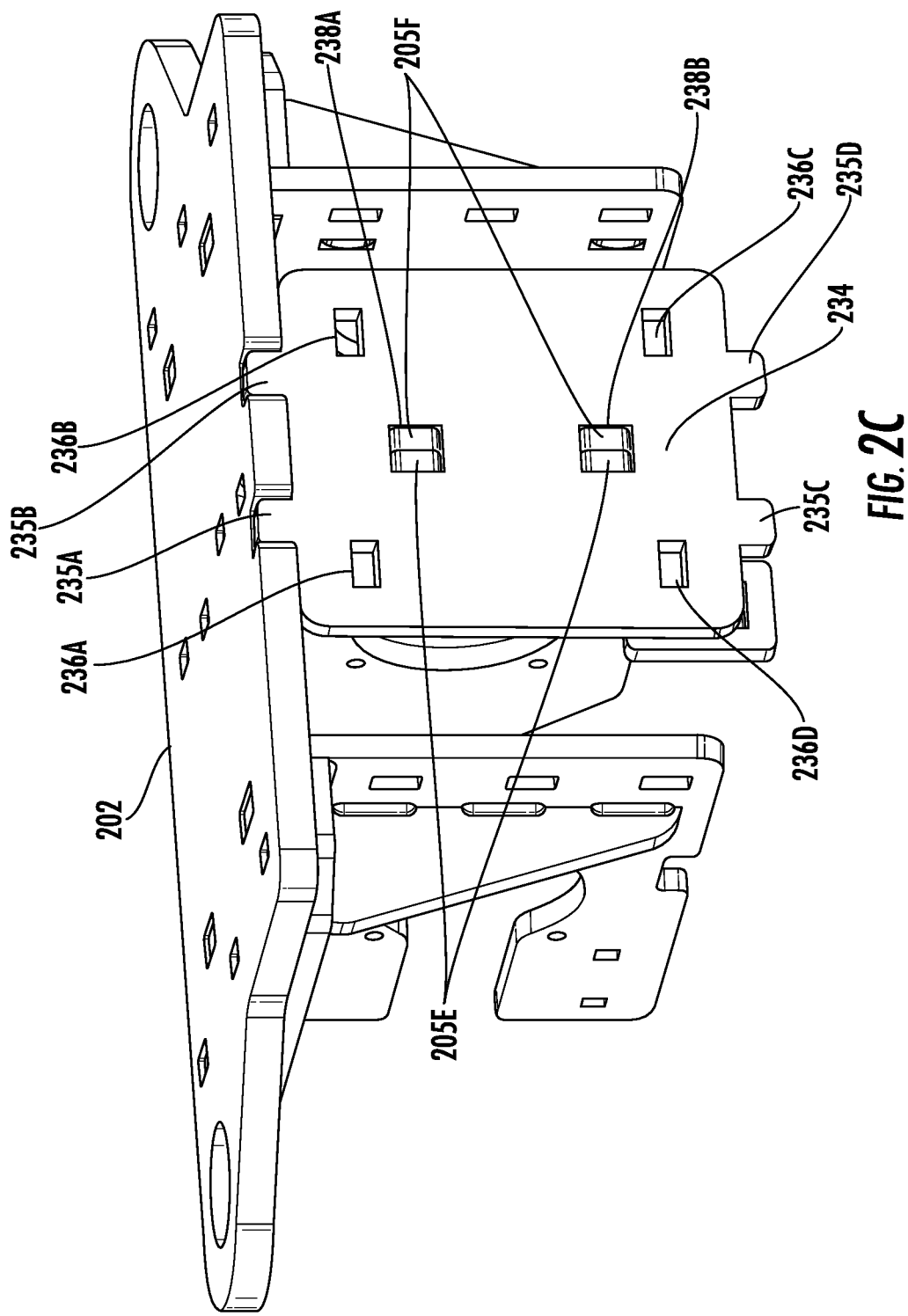

With reference to FIG. 2B, a partial front perspective view of the top bearing assembly 104 is illustrated that includes the base plate 202 having a top surface $202_{Top}$ and a bottom surface $202_{Bottom}$. As shown, the fixed plates 204A and 204B have a top edge $204_{Top}$, a bottom edge $204_{Bottom}$, a front edge $204_{Front}$, and a rear edge $204_{Rear}$. The top edge $204_{Top}$ of the fixed plates 204A and 204B may include a plurality of center plate protruding members 205A-205D. The center plate protruding members 205A-205D may be received in the center plate protrusion receptacles 228A-228D of the base plate 202 and welded therein for permanent coupling. Accordingly, the fixed plates 204A and 204B are coupled with the base plate 202 in a vertically upright manner at the center line of the base plate 202 such that the top edge $204_{Top}$ abuts the center line of the base plate 202. The width of the fixed plates 204A and 204B, from the rear edge $204_{Rear}$ to the front edge $204_{Front}$, is substantially greater than the width of the base plate 202. Thus, the front edge $204_{Front}$ of the fixed plates 204A and 204B protrudes a defined width so as to form a curved corner at the top adjacent to the longitudinal edge 202B of the base plate 202. The front edge $204_{Front}$ is orthogonal to the longitudinal edge 202B of the base plate 202 along half of the length (e.g., a first length "L1") of the front edge $204_{Front}$. Thereafter, the front edge $204_{Front}$ chamfers to a second length "L2" of the front edge $204_{Front}$. Thereafter, the front edge $204_{Front}$ forms an "L" shape that abuts the bottom edge $204_{Bottom}$ of the fixed plates 204A and 204B. The rear edge $204_{Rear}$ has center plate protruding members 205E and 205F (shown in FIG. 2C) which are received in the back plate slot members 238A and 238B and welded therein for permanent coupling.

Figure 2D:
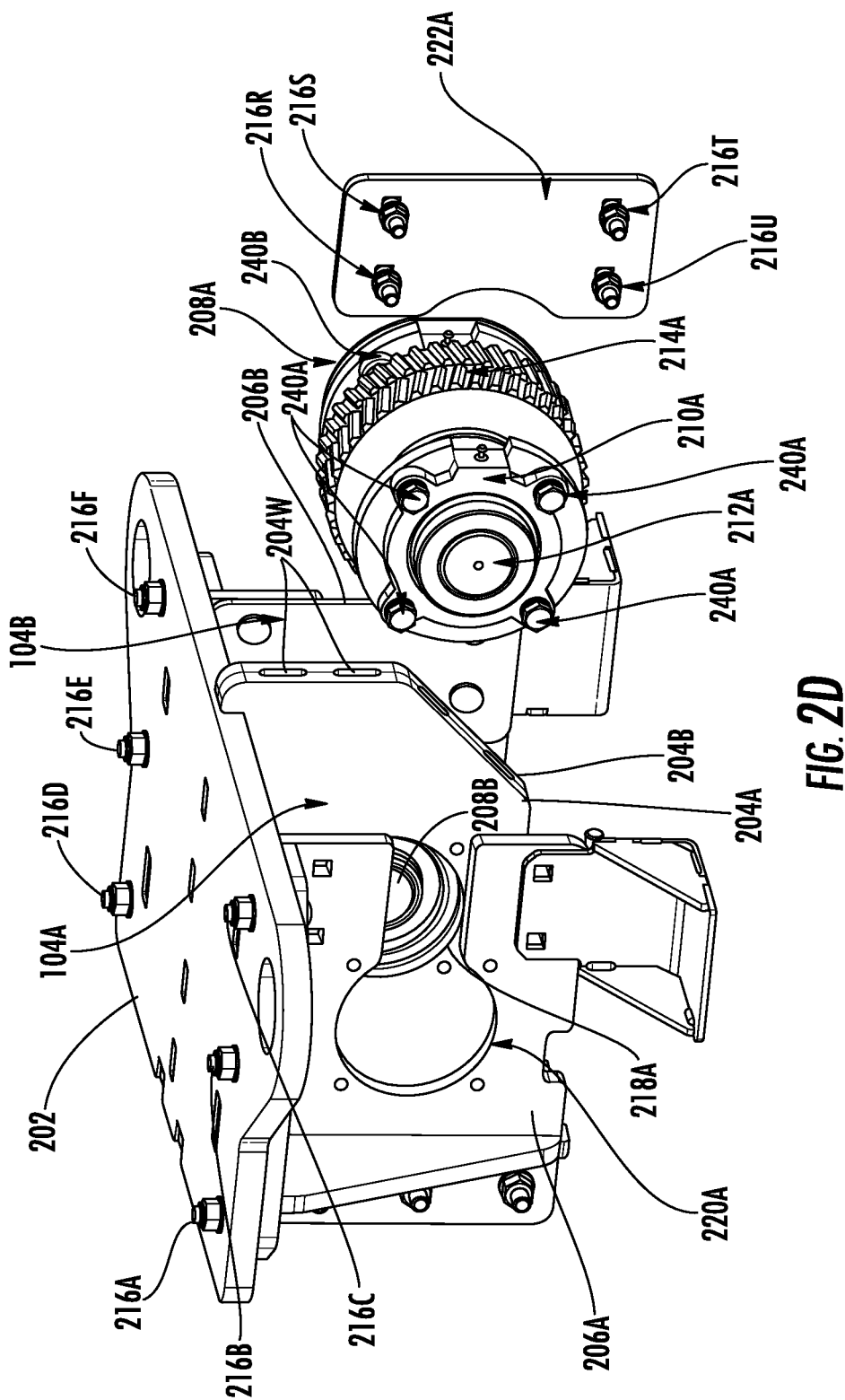
Figure 2E:
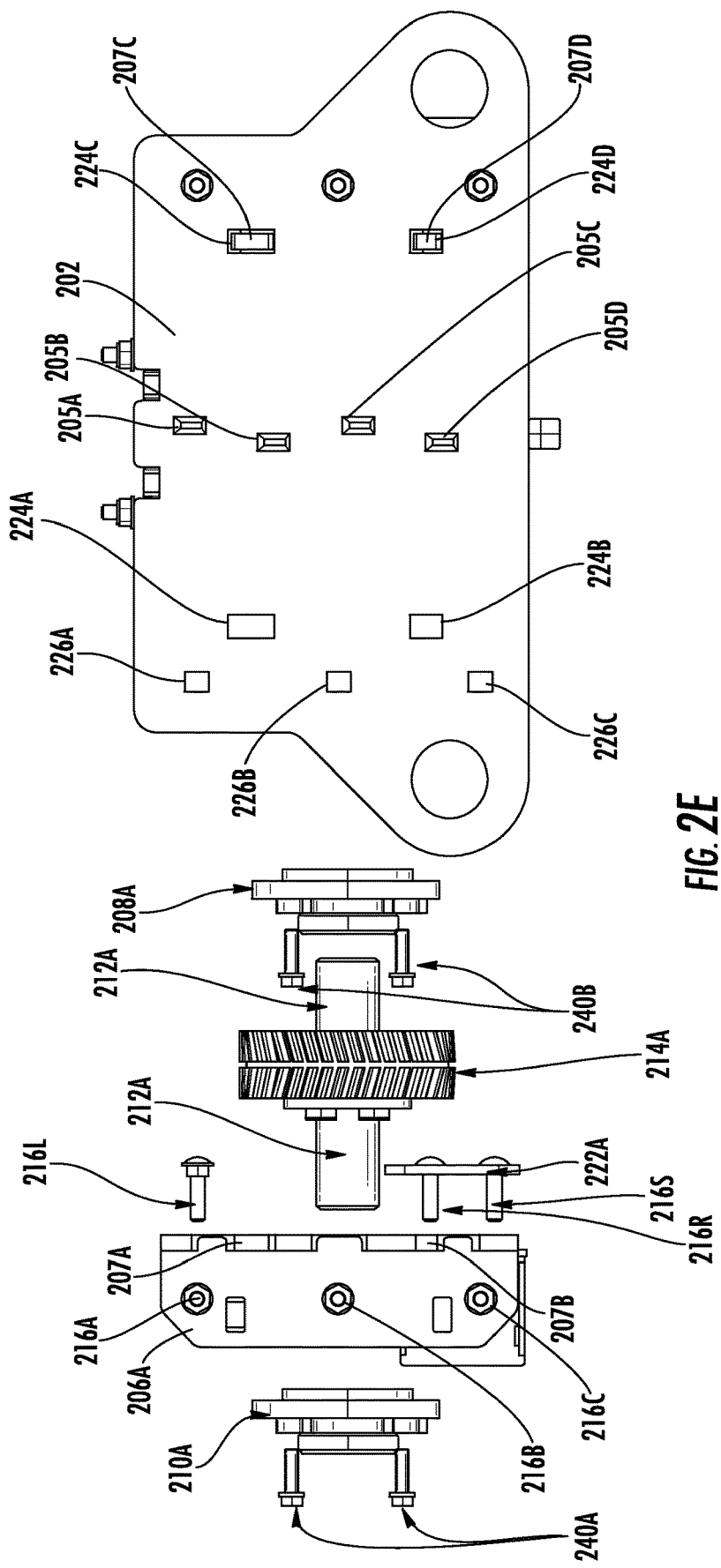
Figure 2F:
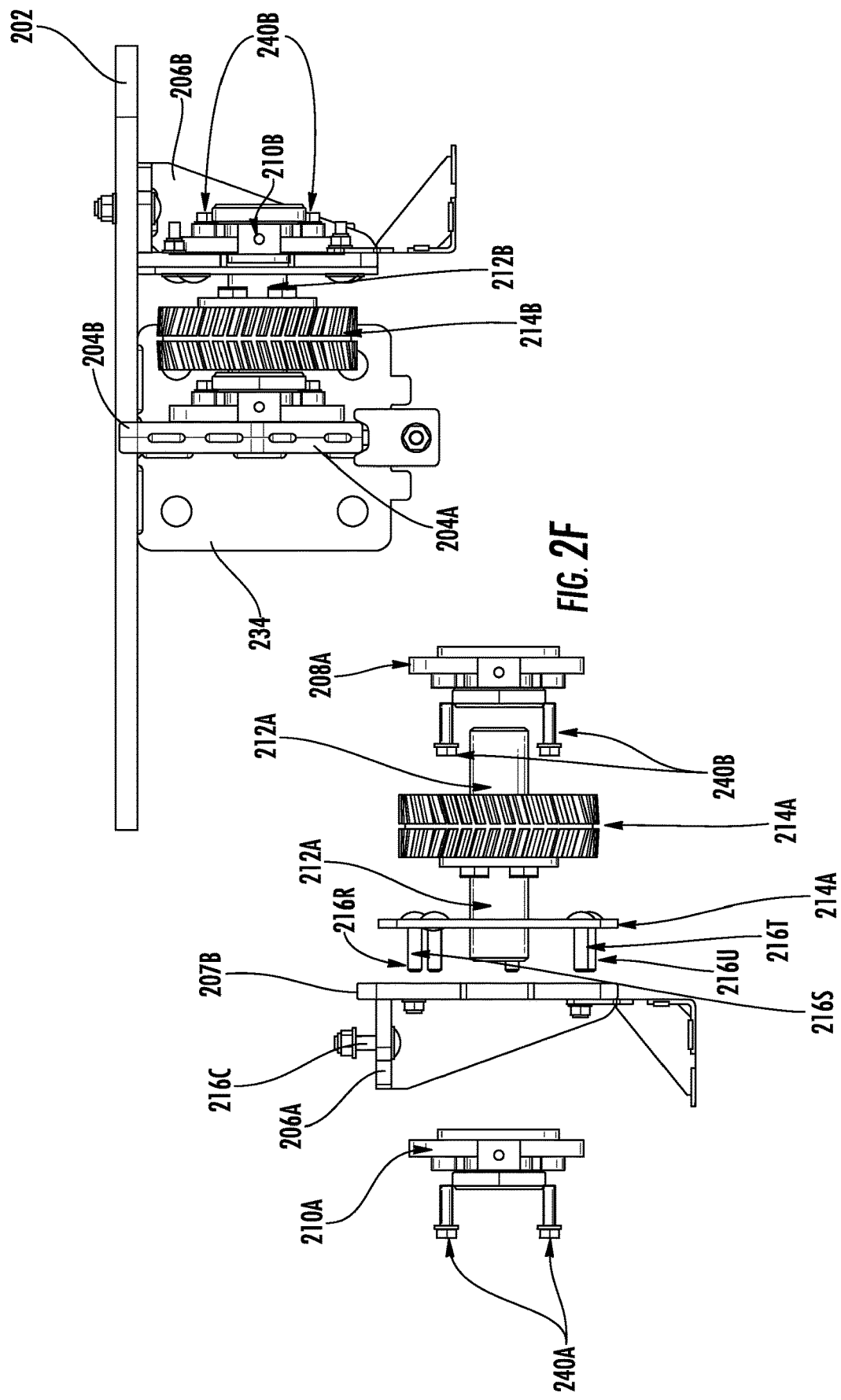

Further, the first fixed plate 204A and the second fixed plate 204B are permanently joined in a parallel manner along the lateral surfaces via multiple center plate welding joints, such as the plurality of weldments 204W. The first fixed plate 204A defines the first bore 218A, and the fixed plate 204B defines the second bore 218B such that the first bore 218A and the second bore 218B overlap and coincide with a central axis. The diameters of the first bore 218A and the second bore 218B may be dimensioned (e.g., sized and shaped) to accommodate the first set of inner bearing members 208A and 208B, respectively. The fixed plates 204A and 204B are supported by the supporting member 230, the lateral surface of which is positioned orthogonally to the lateral surfaces of the fixed plates 204A and 204B. The supporting member 230 includes a slot member configured to overlap with a slot member of the cover member $102_{FrontCoverMember}$ of the mast member 102 and receive the front nut and bolt member 232 for locking. Thus, the front nut and bolt member 232 locks the top bearing assembly 104 with the body of the mid section $102_{Mid}$ of the mast member 102 (as shown in FIG. 2F).

In the partial front perspective view of the top bearing assembly 104, two side plates 206A and 206B that are coupled with the base plate 202 are shown. As illustrated in FIG. 2B, the side plate 206A comprises a first vertical plate $206A_{FVertical}$ having the side plate protruding members 207A and 207B, a second vertical plate $206A_{SVertical}$, and a horizontal plate $206A_{Horizontal}$. The first vertical plate $206A_{FVertical}$ and the horizontal plate $206A_{Horizontal}$ may be rectangular in shape and orthogonally coupled and welded thereafter. The second vertical plate $206A_{SVertical}$ may be triangular in shape having two edges at right angles. The first edge, which may be shorter than a second orthogonal edge, abuts the horizontal plate $206A_{Horizontal}$, and a second straight edge (orthogonal to the first straight edge) abuts the first vertical plate $206A_{FVertical}$. The second vertical plate $206A_{SVertical}$ may be positioned orthogonally to the first vertical plate $206A_{FVertical}$ and the horizontal plate $206A_{Horizontal}$ and at a defined distance away from the distal edge of the first vertical plate $206A_{FVertical}$ and the horizontal plate $206A_{Horizontal}$.

The top lateral surface of the horizontal plate $206A_{Horizontal}$ abuts the bottom surface $202_{Bottom}$ of the base plate 202. The horizontal plate $206A_{Horizontal}$ includes a plurality of slot members that overlap with the fastening slot members 226A-226C of the base plate 202. Further, portions of the top edge of the first vertical plate $206A_{FVertical}$ are extended as the side plates protruding members 207A-207D are received in the tolerance adjustment slot members 224A-224D. The two side plates 206A and 206B are positioned vertically upright at the sides of the base plate 202. The first vertical plate $206A_{FVertical}$ of the side plate 206A may be parallel to the fixed plates 204A and 204B. It may be noted that the structure of the other side plate 206B is similar to the structure of the side plate 206A and not described herein for the sake of clarity.

The two side plates 206A and 206B, as shown, include the first open groove member 220A and the second open groove member 220B, respectively. The diameter of the first open groove member 220A and the second open groove member 220B may be dimensioned (e.g., sized and shaped) to accommodate the first set of outer bearing members 210A and 210B, respectively. The first open groove member 220A, the first bore 218A, the second bore 218B, and the second open groove member 220B may be coaxial and overlap along a common central axis. In an example embodiment, the first open groove member 220A may be an open ended bore having a circular portion and a rectangular portion. The circular portion may be coaxial with the first bore 218A and overlap it along a common central axis. The longitudinal edges of the rectangular portion are parallel to the lateral surface of the base plate 202. One orthogonal edge of the rectangular portion abuts the circular portion and the other orthogonal edge of the rectangular portion abuts the front edge of the side plate 206A. The height of the orthogonal edges may be dimensioned (e.g., sized and shaped) such that the rectangular portion allows the passage of the first top shaft member 212A having the inner bearing member 208A and the outer bearing member 210A installed thereon on either side of the first top shaft member 212A. One end of the first top shaft member 212A having the inner bearing member 208A is placed in the first bore 218A, and the other end of the first top shaft member 212A having the outer bearing member 210A is slidably adjusted in the circular portion of the first open groove member 220A through the rectangular portion. Once adjusted, the inner bearing members 208A and the outer bearing member 210A are coupled with the fixed plate 204A and the side plate 206A, respectively, using bearing bolt members 240A and 240B (as shown in FIG. 2D). In a similar manner, the inner bearing members 208B and the outer bearing member 210B are coupled with the fixed plate 204B and the side plate 206B, respectively, using bearing bolt members 240A and 240B (as shown clearly in FIG. 2D).

Referring to FIG. 2C-2F, various views of the top bearing assembly 104 are illustrated. As shown, the top bearing assembly 104 includes the back plate 234 that further includes the back plate slot members 238A and 238B configured to receive the center plate protruding members 205E and 205F located at distal vertical edges of the fixed plates 204A and 204B. The back plate 234 may further define two back plate protruding members 235A and 235B at the top edge and two back plate protruding members 235C and 235D at the bottom edge. The two back plate protruding members 235A and 235B at the top edge may be received by the two back plate protrusion receptacles 228E and 228F, respectively, along the longitudinal edge 202A of the base plate 202. The two back plate protruding members 235C and 235D at the bottom edge may be received by the top section $102_{Top}$ of the mast member 102.

Referring to FIG. 2D, an exploded side perspective view of the top bearing assembly 104 is illustrated. The exploded side perspective view of the top bearing assembly 104 includes the fixed plates 204A and 204B and the two side plates 206A and 206B coupled with the base plate 202 using the plurality of top nut and bolt members 216A-216F. There is further shown the two sub-assemblies of the top bearing assembly 104. FIG. 2D illustrates the first top bearing sub-assembly 104A and, as would be evident to one of ordinary skill in the art in light of the present disclosure, the second top bearing sub-assembly 104B may be the same configuration as the top bearing assembly 104.

The first top bearing sub-assembly 104A includes one of the first set of inner bearing members 208A and 208B (e.g., 208A), one of the first set of outer bearing members 210A and 210B (e.g., 210A), and the first sprocket wheel member 214A installed therebetween on the first top shaft member 212A. This assembly is installed in such a manner that one end of the first top shaft member 212A with the one of the first set of inner bearing members 208A and 208B (e.g., 208A) installed thereon is placed in the first bore 218A. Other end of the first top shaft member 212A, having the outer bearing member 210A installed thereon, is slidably adjusted in the circular portion of the first open groove member 220A through the rectangular portion. Once adjusted, the inner bearing member 208A and the outer bearing member 210A are coupled with the fixed plate 204A and the side plate 206A, respectively, using bearing bolt members 240B and 240A. In a similar manner, the inner bearing member 208B and the outer bearing member 210B are coupled with the fixed plate 204B and the side plate 206B, respectively, using bearing bolt members 240B and 240A, respectively.

Figure 2G:
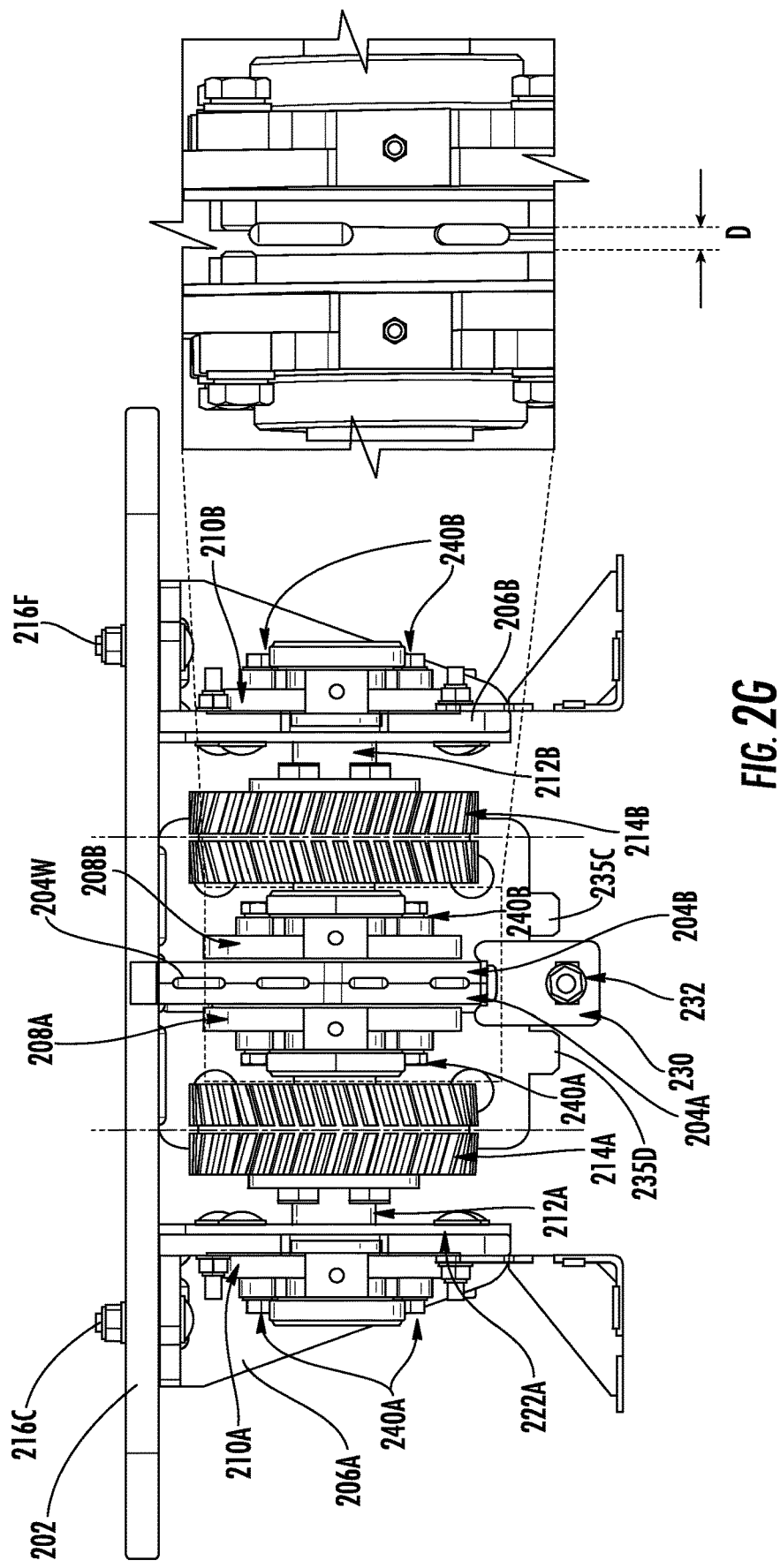

Referring to FIG. 2G, a front view of the top bearing assembly 104 is illustrated. The front view of the top bearing assembly 104 includes the inner bearing member 208A installed on the first top shaft member 212A coupled at the first fixed plate 204 and separated from the other inner bearing member 208B installed on the second top shaft member 212B coupled at the second fixed plate 204B by a centerplate offset "D". The centerplate offset "D" is located between the inner bearing member 208A and the other inner bearing member 208B secured in the first bore 218A and the second bore 218B, respectively. The two side plates 206A and 206B may be adjustably coupled upright at side positions of the base plate 202 based on the width of the mast member 102. In some embodiments, the width of mast member 102 may vary between 11.875 inches and 12.125 inches. In such embodiments, the distance of either of the two side plates 206A and 206B from the center point between the fixed plates 204A and 204B may vary between 5.938 inches and 6.063 inches. Further, the distance of the first sprocket wheel member 214A and the second sprocket wheel member 214B from the center point between the fixed plates 204A and 204B may be a fixed distance of 4.475 inches. Thus, the alignment of the first sprocket wheel member 214A and the second sprocket wheel member 214B is equidistant from the center point between the fixed plates 204A and 204B and independent of the width of the mast member 102. As the first sprocket wheel member 214A and the second sprocket wheel member 214B are located from the center point, this ensures that the first sprocket wheel member 214A and the second sprocket wheel member 214B are in the same place regardless of the width of the mast member 102. The side plates 206A and 206B may only slide in or out to accommodate the difference in the width of the mast member 102.

Figure 2H:
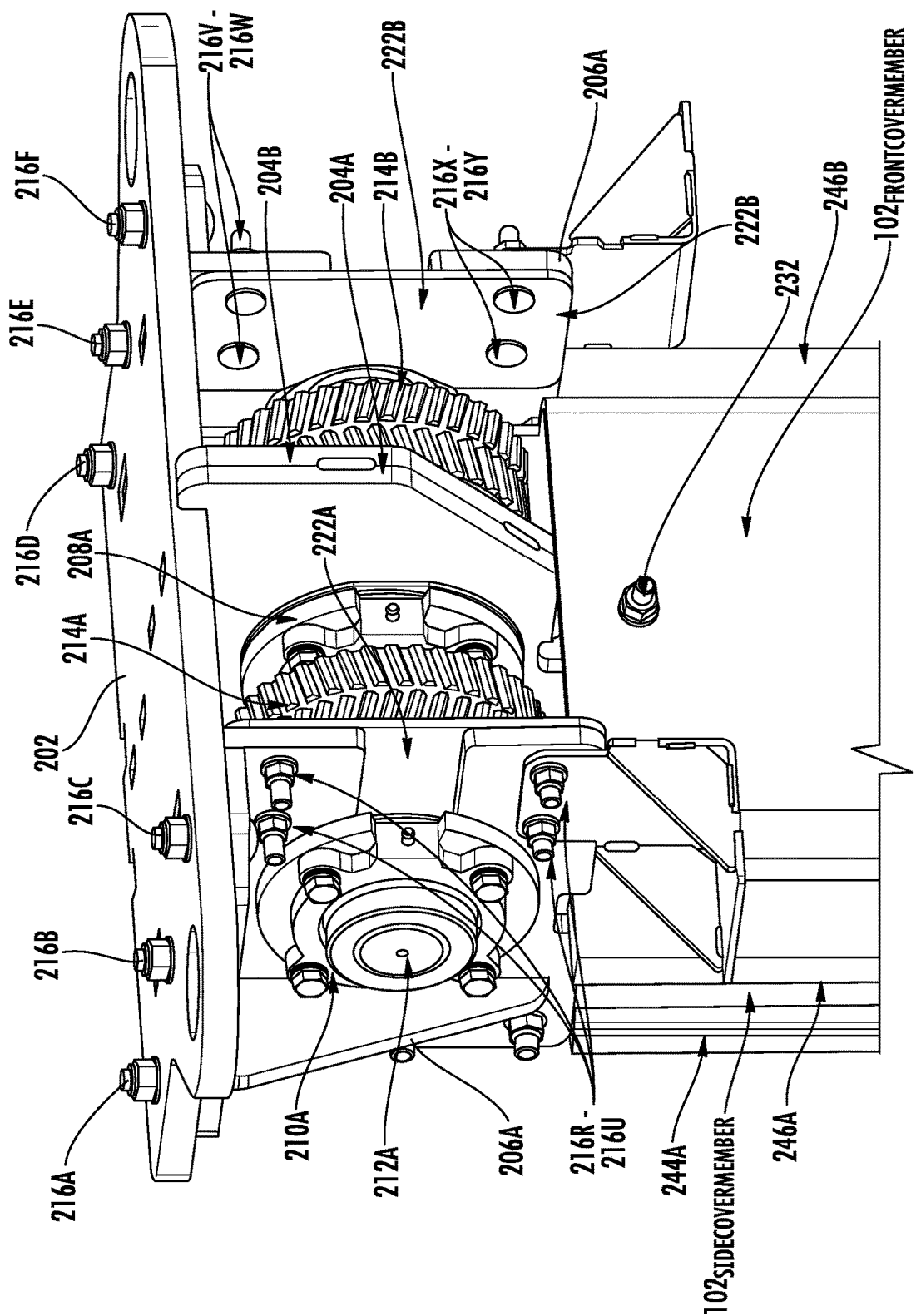

Referring to FIGS. 2H and 2I, perspective front and rear views of the top bearing assembly 104 installed proximate the top section $102_{Top}$ of the mast member 102 are illustrated. The first top bearing sub-assembly 104A includes the one of the first set of inner bearing members 208A and 208B (e.g., 208A), the one of the first set of outer bearing members 210A and 210B (e.g., 210A), and the first sprocket wheel member 214A installed therebetween on the first top shaft member 212A. The first top bearing sub-assembly 104A is installed in such a manner that the one of the first set of outer bearing members 210A and 210B (e.g., 210A) couples with the periphery of the first open groove member 220A using the bearing bolt member 240A. Further, one of the first set of inner bearing members 208A and 208B (e.g., 208A), couples with the periphery of the first bore 218A using the nut and bolt members 240B. Once installed, the first top bearing sub-assembly 104A is secured using the first covering plate 222A and the first covering plate 222A is coupled with the side plate 206A using the nut and bolt members 216R-216U. The proximal vertical edge of the first covering plate 222A is straight and the distal vertical edge is curved to provide a continuous boundary to the first open groove member 220A upon coupling with the first open groove member 220A using the plurality of cover plate nut and bolt members 216R-216U.

Similarly, the second top bearing sub-assembly 104B includes the other of the first set of inner bearing members 208A and 208B (e.g., 208B), the other of the first set of outer bearing members 210A and 210B (e.g., 210B), with the second sprocket wheel member 214B installed therebetween on the second top shaft member 212B. The second top bearing sub-assembly 104B of the top bearing assembly 104 is installed in such a manner that the other of the first set of outer bearing members 210A and 210B (e.g., 210B) is coupled with the periphery of the second open groove member 220B using bearing bolt member 240A and the other of the first set of inner bearing members 208A and 208B (e.g., 208B), is coupled with the periphery of the second bore 218B using bearing bolt member 240B. Once installed, the second top bearing sub-assembly 104B is secured using the second covering plate 222B and the second covering plate 222B is coupled with the side plate 206B using nut and bolt members 216V-216Y. The proximal vertical edge of the second covering plate 222B is straight and the distal vertical edge is curved to provide a continuous boundary to the second open groove member 220B upon coupling with the second open groove member 220B using the plurality of cover plate nut and bolt members 216V-216Y.

Guiding rails 244A and 244D, as shown, are installed at the side surfaces, such as $102_{SideCoverMember}$ of the mast member 102. The guiding rails 244B and 244C are coupled at the rear surface, i.e. the $102_{RearCoverMember}$ of the mast member 102. The guiding rails 244A-244D are coupled vertically along the length of the mast member 102. As shown, the guiding member 246A may be positioned at the side surface, such as $102_{SideCoverMember}$ of the mast member 102. Similarly, the guiding member 246B may be positioned at the opposite side surface of the mast member 102.

The front nut and bolt member 232 couples the supporting member 230 of the top bearing assembly 104 with the cover member $102_{FrootCoverMember}$ at the top section $102_{Top}$ of the mast member 102. Also, the plurality of rear nut and bolt members 216G-216J couple the back plate 234 of the top bearing assembly 104 with the rear cover member $102_{RearCoverMember}$ of the mast member 102 through the mast coupling slot members 236A-236D (positioned on the back plate 234) and slot members on the rear cover member $102_{RearCoverMember}$ of the mast member 102. Further, the top bearing assembly 104 may be coupled with the top section $102_{Top}$ of the mast member 102 through the slot members on the side plate 206A and 206B and corresponding slot members on the side cover member $102_{SideCoverMember}$ of the mast member 102 using the plurality of side nut and bolt members 216L-216Q.

FIGS. 3A-3E illustrate views of the bottom bearing assembly 106 of the carriage lift assembly 101 in the material handling system 100, as shown in FIG. 1, in accordance with one or more embodiments of the present disclosure. As described in FIG. 1, the bottom bearing assembly 106 may be installed proximate the bottom section $102_{Bottom}$ of the mast member 102 of the carriage lift assembly 101.

With reference to various views illustrated in FIGS. 3A-3E, the bottom bearing assembly 106 may include two sub-assemblies: a first bottom bearing sub-assembly 106A and a second bottom bearing sub-assembly 106B. The bottom bearing assembly 106 may further include a bottom base plate 302, fixed plates 304A and 304B, a plurality of weldments 304W, center plate protruding members 305A-305F, two side plates 306A and 306B, side plates protruding members 307A-307D, a second set of inner bearing members 308A and 308B, a second set of outer bearing members 310A and 310B, a first bottom shaft member 312A, a second bottom shaft member 312B, a first sprocket wheel member 314A, a second sprocket wheel member 314B, a plurality of top nut and bolt members 316A-316F, a plurality of rear nut and bolt members 316G-316L, a plurality of side nut and bolt members 316M-316R, a first bore 318A, a second bore 318B, a first open groove member 320A, and a second open groove member 320B. The bottom base plate 302 may further include tolerance adjustment slot members 324A-2324D, fastening slot members 326A-326F, center plate protrusion receptacles 328A-2328D, and back plate protrusion receptacles 328E and 328F. The bottom bearing assembly 106 may further include a supporting member 330, a front nut and bolt member 332, a back plate 334, back plate protruding members 335A-335D, mast coupling slot members 336A-336F, and back plate slot members 338A and 338B. There is further shown bearing bolt members 340A and 340B.

Figure 3A:
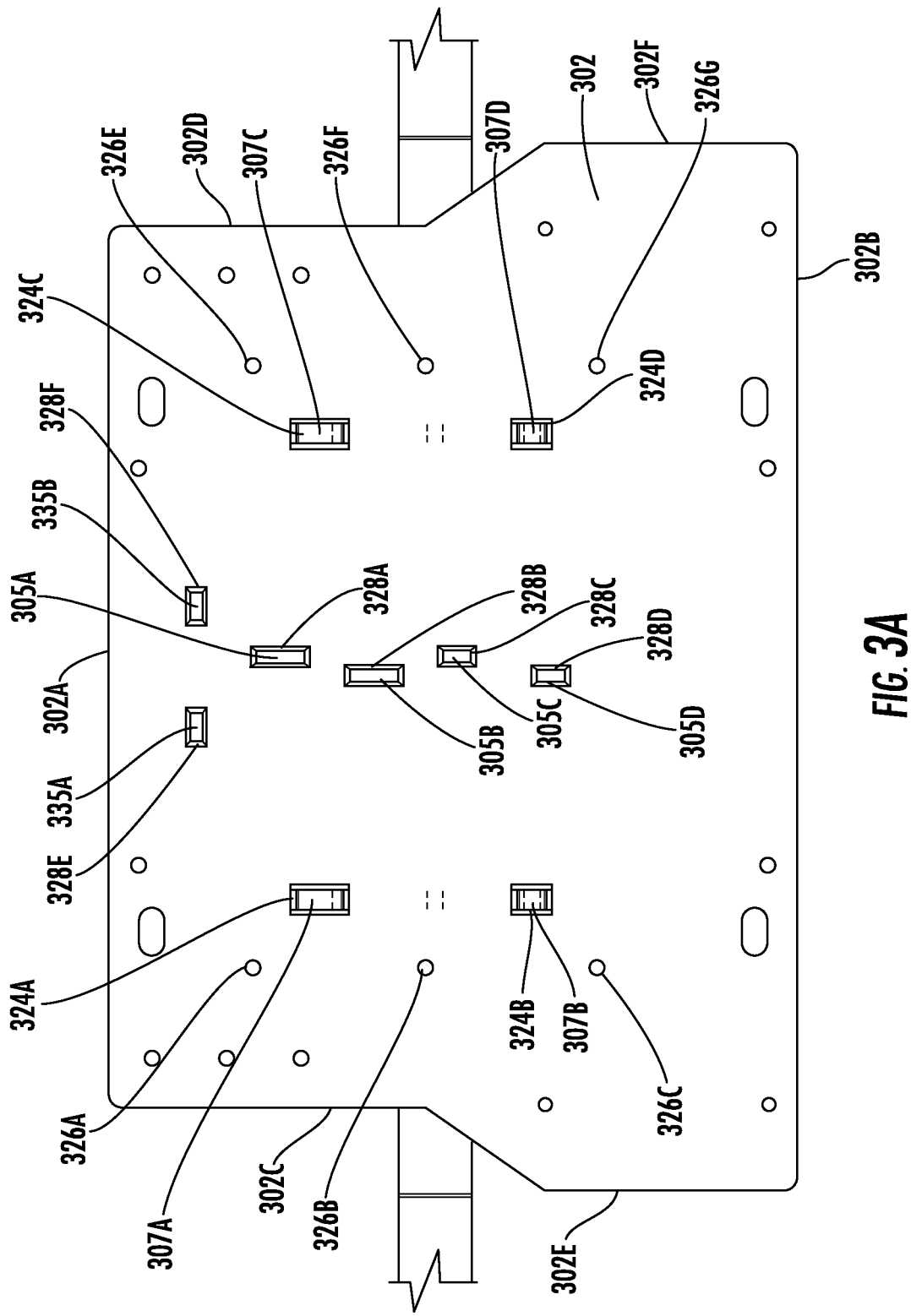

Referring to FIG. 3A, a top view of the bottom base plate 302 of the bottom bearing assembly 106 is illustrated. The bottom base plate 302 may define a trapezoidal shape having two parallel longitudinal edges 302A and 302B. With respect to the front view of the carriage lift assembly 101, the longitudinal edge 302A is a distal edge and the longitudinal edge 302A is a proximal edge having a longer length as compared to the longitudinal edge 302A. The left side edge of the bottom base plate 302 may be defined as a combination of edge portions 302C and 302E, with the edge portion 302C being orthogonal to longitudinal edge 302A and the edge portion 302E being a winged shape merging with the longitudinal edge 302B. Similarly, the right side edge of the bottom base plate 302 may be defined as a combination of edge portions 302D and 302F, with the edge portion 302D being orthogonal to longitudinal edge 302A and the edge portion 302F being a winged shape merging with the longitudinal edge 302B.

The bottom base plate 302 has the tolerance adjustment slot members 324A-324D positioned in such a manner that the slot member 324A is proximal to the edge portion 302C, slot member 224B is proximal to the edge portion 202E, slot member 324C is proximal to the edge portion 302D, and slot member 324D is proximal to the edge portion 302F. The slot members 324A and 324B are aligned in a linear pattern that is orthogonal to the longitudinal edges 302A and 302B at a first defined distance from the edge portions 302C and 302E, respectively. Similarly, the slot member 324C and the slot member 324D are aligned in a linear manner orthogonal to the longitudinal edges 302A and 302B at the first defined distance from the edge portions 302D and 302F, respectively.

The tolerance adjustment slot members 324A-324D may be configured to receive the side plates protruding members 307A-307D of the two side plates 306A and 306B when the two side plates 306A and 306B are coupled with the bottom base plate 302. The center plate protrusion receptacles 328A-328D may be configured to receive center plate protruding members 305A-305D of the fixed plates 304A and 304B when the fixed plates 304A and 304B are coupled with the bottom base plate 302. Further, two back plate protrusion receptacles 328E and 328F, positioned along the longitudinal edge 302A proximal to the center plate protruding member 305A, may be configured to receive the back plate protruding members 335A and 335B when the back plate 334 is coupled with the bottom base plate 302.

The tolerance adjustment slot members 324A-324D may provide a defined space for adjusting each of the two side plates 306A and 306B by moving the two side plates 306A and 306B along the longitudinal edges 302A and 302B. The adjustment of the two side plates 306A and 306B may be based on width of the mast member 102. In an embodiment, the dimensions of the two tolerance adjustment slot members 324A and 324C, and the side plate protruding members 307A and 307C may be different from the dimensions of other two tolerance adjustment slot members 324B and 324D, and the side plate protruding members 307B and 307D.

The fastening slot members 326A-326C may be aligned in a linear pattern that is orthogonal to the longitudinal edges 202A and 202B at a second defined distance from the edge portions 202C and 202E. Similarly, the fastening slot members 226D-226F may be aligned in a linear pattern that is orthogonal to the longitudinal edges 202A and 202B at the second defined distance from the edge portions 202D and 202F. The second defined distance may be less than the first defined distance.

The fastening slot members 226A-226F of the bottom base plate 302 may overlap with the slot members in the horizontal portion of the two side plates 306A and 306B (not shown). The overlapped slot members of the bottom base plate 302 and the side plates 306A and 306B may be configured to receive the plurality of top nut and bolt members 316A-316F (shown in FIG. 3C) to couple the bottom base plate 302 with the two side plates 306A and 306B. In an example embodiment, the plurality of top nut and bolt members 316A-316F may be loosened such that the two side plates 306A and 306B may further slide in or out depending on the width of the mast member 102. In some example embodiments, the width of the mast member 102 may be eleven (11) inches. In such an embodiments, the two side plates 306A and 306B may slide in, and, once adjusted, may couple with the bottom base plate 302 using the plurality of top nut and bolt members 316A-316F via the fastening slot members 326A-326F. In another example embodiment, the width of the mast member 102 may be 12.10 inches. In such an embodiment, the two side plates 306A and 306B may slide out and, once adjusted, coupled with the bottom base plate 302 using the plurality of top nut and bolt members 316A-316F through the fastening slot members 326A-326F.

Figure 3B:
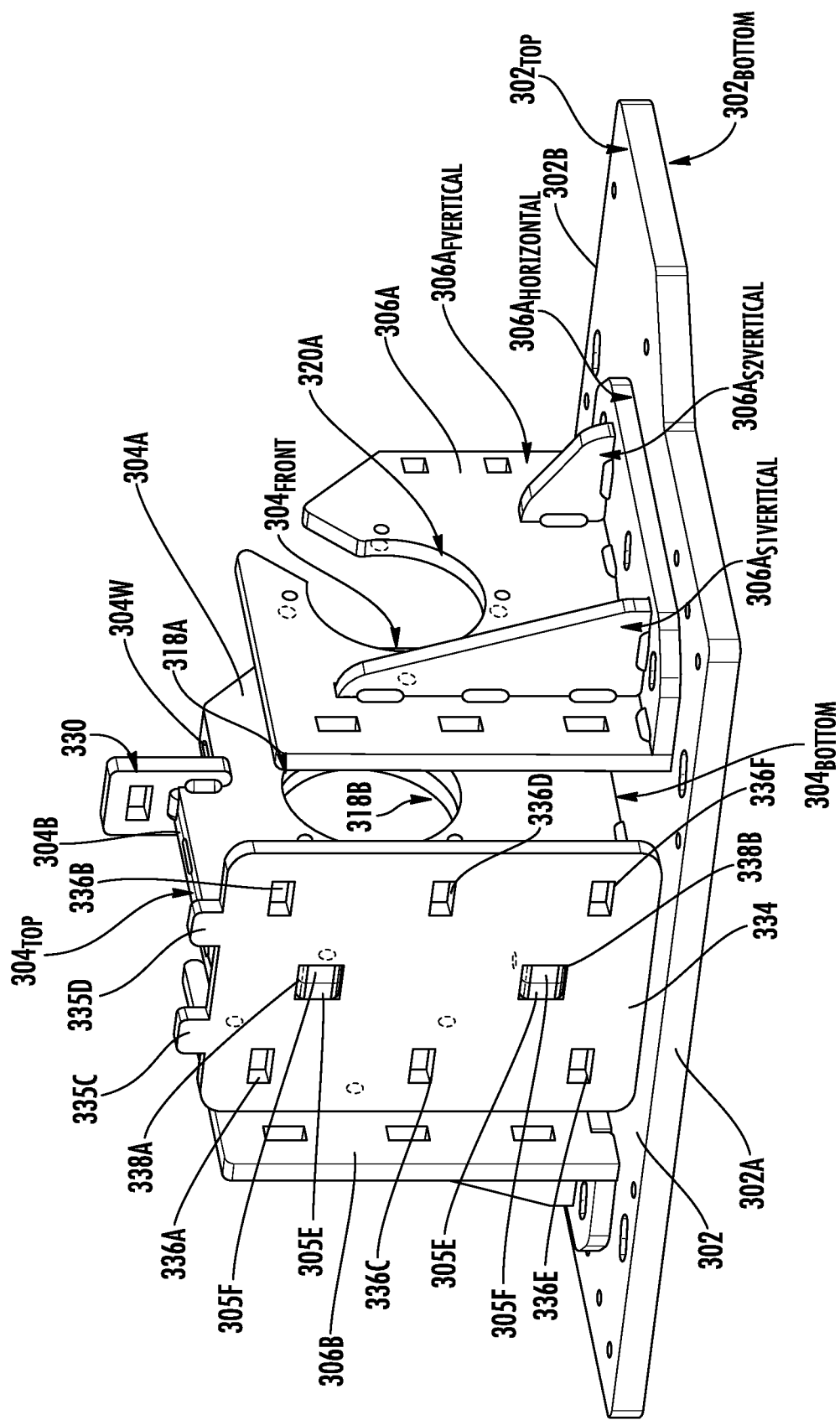

Referring to FIG. 3B, a partial perspective view of the bottom bearing assembly 106 is illustrated. The partial front perspective view of the bottom bearing assembly 106 includes the bottom base plate 302 having a top surface $302_{Top}$ and a bottom surface $302_{Bottom}$.

As shown, the fixed plates 304A and 304B include a top edge $304_{Top}$, a bottom edge $304_{Bottom}$, a front edge $304_{Front}$, and a rear edge $304_{Rear}$. The bottom edge $304_{Bottom}$ of the fixed plates 304A and 304B may include a plurality of center plate protruding members 305A-305D. The center plate protruding members 305A-305D may be received in the center plate protrusion receptacles 328A-328D of the bottom base plate 302 and welded therein for permanent coupling. Accordingly, the fixed plates 304A and 304B are coupled with the bottom base plate 302 in a vertically upright manner at the center line of the bottom base plate 302 such that the bottom edge $204_{Bottom}$ abuts the center line of the bottom base plate 302. The width of the fixed plates 304A and 304B, from the rear edge $304_{Rear}$ to the front edge $304_{Front}$, is substantially less than the width of the bottom base plate 302. The front edge $304_{Front}$ is orthogonal to the longitudinal edge 302B of the bottom base plate 302 along half of the length (e.g., a first length "L1") of the front edge $304_{Front}$. Thereafter, the front edge $204_{Front}$ chamfers to a second length "L2" of the front edge $304_{Front}$. Thereafter, the front edge $304_{Front}$ forms an "L" shape that abuts the top edge $304_{Top}$ of the fixed plates 304A and 304B. The rear edge $304_{Rear}$ has center plate protruding members 305E and 305F (shown in FIG. 3C) that are received in the back plate slot members 338A and 338B and welded therein for permanent coupling.

Further, the first fixed plate 304A and the second fixed plate 304B are permanently joined in a parallel manner along the lateral surfaces via multiple center plate welding joints, such as the plurality of weldments 304W. The first fixed plate 304A is shown to define the first bore 318A, and the fixed plate 204B is shown to define the second bore 318B, such that the first bore 318A and the second bore 318B overlap and coincide with a central axis. The diameters of the first bore 318A and the second bore 318B may be dimensioned (e.g., sized and shaped) to accommodate the second set of inner bearing members 308A and 308B, respectively. The fixed plates 304A and 304B are supported by the supporting member 330, the lateral surface of which is positioned orthogonally to the lateral surfaces of the fixed plates 304A and 304B. The supporting member 330 includes a slot member configured to overlap with a slot member proximate the base of the cover member $102_{FrontCoverMember}$ of the mast member 102 and receive the front nut and bolt member 332 for locking. Thus, the front nut and bolt member 332 locks the bottom bearing assembly 106 with the body of the mid section $102_{Mid}$ of the mast member 102 (as shown in FIG. 3D).

As shown in the partial perspective view of the bottom bearing assembly 106, two side plates 306A and 306B are coupled with the bottom base plate 302. As illustrated in FIG. 3B, the side plate 306A comprises a first vertical plate $306A_{FVertical}$ having the side plate protruding members 307A and 307B, a second vertical plate $306A_{S1Vertical}$, another second vertical plate $306A_{S2Vertical}$, and a horizontal plate $306A_{Horizontal}$. The first vertical plate $306A_{FVertical}$ and the horizontal plate $306A_{Horizontal}$ may be rectangular in shape and orthogonally coupled together and welded thereafter. The top front end of the first vertical plate $306A_{FVertical}$ may be chamfered. The second vertical plate $306A_{S1Vertical}$ may be triangular in shape having two edges at right angles. The first edge, which is shorter than a second orthogonal edge, abuts the horizontal plate $306A_{Horizontal}$, and a second straight edge (orthogonal to the first straight edge) abuts the first vertical plate $306A_{FVertical}$. Similarly, the other second vertical plate $306A_{S2Vertical}$ may also be triangular in shape having two edges at right angles. The first edge, which is longer than a second orthogonal edge but equal to the first edge of the second vertical plate $306A_{S1Vertical}$, abuts the horizontal plate $306A_{Horizontal}$, and a second straight edge (orthogonal to the first straight edge) abuts the first vertical plate $306A_{FVertical}$. The second straight edge of the other second vertical plate $306A_{S2Vertical}$ may be shorter than the second straight edge of the second vertical plate $306A_{S1Vertical}$. The other second vertical plate $306A_{S2Vertical}$ may be positioned orthogonally to the first vertical plate $306A_{FVertical}$ and the horizontal plate $306A_{Horizontal}$ and at a defined distance away from the distal edge of the first vertical plate $306A_{FVertical}$ and the horizontal plate $306A_{Horizontal}$. The other second vertical plate $306A_{S2Vertical}$ may be installed to provide additional support to the side plate 306A. The present disclosure contemplates a similar arrangement for the side plate 306B (not shown).

The bottom lateral surface of the horizontal plate $306A_{Horizontal}$ abuts the top surface $302_{Top}$ of the bottom base plate 302. The horizontal plate $306A_{Horizontal}$ has a plurality of slot members that overlap with the fastening slot members 326A-326C of the bottom base plate 302. Further, portions of the top edge of the first vertical plate $306A_{FVertical}$ are extended as the side plate protruding members 307A-307D are received in the tolerance adjustment slot members 324A-324D. The two side plates 306A and 306B are positioned vertically upright at the sides of the bottom base plate 302. The first vertical plate $306A_{FVertical}$ of the side plate 306A is parallel to the fixed plates 304A and 304B. It may be noted that the structure of the other side plate 306B is similar to the structure of the side plate 306A, as described above, not described here for the sake of convenience of description.

The two side plates 306A and 306B are shown to include the first open groove member 320A and the second open groove member 320B, respectively. The diameter of the first open groove member 320A and the second open groove member 320B may be dimensioned (e.g., sized and shaped) to accommodate the first set of outer bearing members 310A and 310B, respectively. The first open groove member 320A, the first bore 318A, the second bore 318B, and the second open groove member 320B may be coaxial and overlap along a common central axis. In an example embodiment, the first open groove member 320A may be an open ended bore having a circular portion and a rectangular portion. The circular portion may be coaxial with the first bore 318A and overlap it along a common central axis. The longitudinal edges of the rectangular portion may be parallel to the chamfered edge of the side plate 306A. One orthogonal edge of the rectangular portion abuts the circular portion and the other orthogonal edge of the rectangular portion abuts the chamfered edge of the side plate 306A. The height of the orthogonal edges may be substantially equal to the diameter of the first bottom shaft member 312A such that the rectangular portion allows the passage of the first bottom shaft member 312A having the inner bearing member 308A and the outer bearing member 310A installed thereon on either side of the first bottom shaft member 312A. One end of the first bottom shaft member 312A having the inner bearing member 308A is placed in the first bore 318A, and the other end of the first bottom shaft member 312A having the outer bearing member 310A is slidably adjusted in the circular portion of the first open groove member 320A through the rectangular portion. In a similar manner, the inner bearing members 308B and the outer bearing member 310B are coupled with the fixed plate 304B and the side plate 306B, respectively, using bearing bolt members 340A and 340B (as shown clearly in FIG. 2C).

Figure 3C:
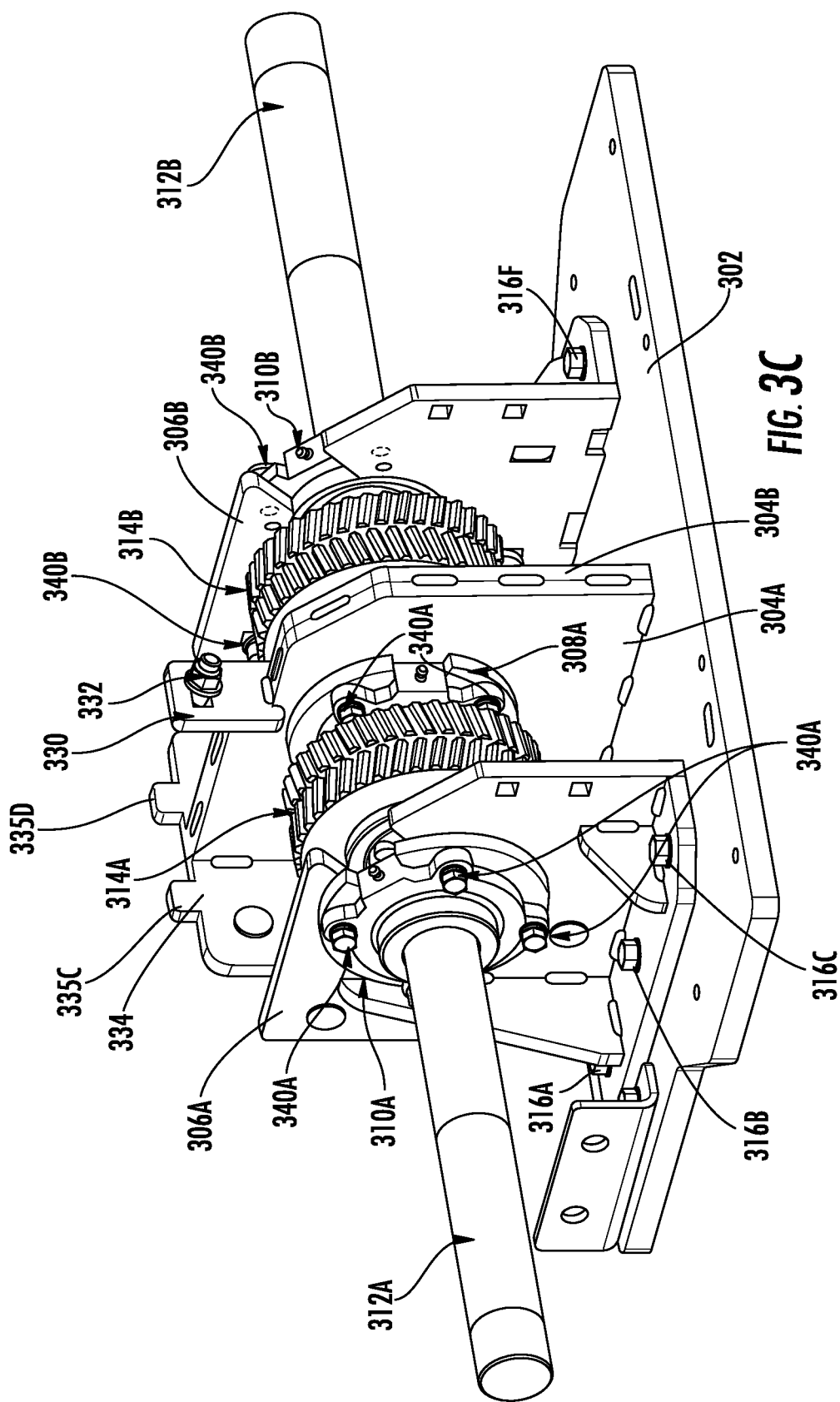

Referring to FIG. 3C, there is illustrated an exploded side perspective view of the bottom bearing assembly 106. The exploded side perspective view of the bottom bearing assembly 106 is illustrated to include the fixed plates 304A and 304B and the two side plates 306A and 306B coupled with the bottom base plate 302 using the plurality of top nut and bolt members 316A-316F. There is further shown the two sub-assemblies of the bottom bearing assembly 106. FIG. 3C illustrates a first bottom bearing sub-assembly 106A and, as would be evident to one of ordinary skill in the art in light of the present disclosure, the second bottom bearing sub-assembly 106B may be substantially equivalent in configuration to the bottom bearing assembly 106.

The first bottom bearing sub-assembly 106A includes one of the second set of inner bearing members 308A and 308B (e.g., 308A), one of the second set of outer bearing members 310A and 310B (e.g., 310A), and the first sprocket wheel member 314A installed therebetween on the first bottom shaft member 312A. Such assembly is installed in such a manner that one end of the first bottom shaft member 312A with the one of the second set of inner bearing members 308A and 308B (e.g., 308A), installed thereon, is placed in the first bore 318A. Other end of the first bottom shaft member 312A having the outer bearing member 310A installed thereon is slidably adjusted in the circular portion of the first open groove member 320A through the rectangular portion. Once adjusted, the inner bearing member 308A and the outer bearing member 310A are coupled with the fixed plate 304A and the side plate 306A, respectively, using bearing bolt members 340B and 340A. In a similar manner, the inner bearing member 308B and the outer bearing member 310B are coupled with the fixed plate 304B and the side plate 306B, respectively, using bearing bolt members 340B and 340A, respectively.

Referring to FIG. 3D, a front view of the bottom bearing assembly 106 is illustrated. The front view of the bottom bearing assembly 106 includes the inner bearing member 308A installed on the first bottom shaft member 312A coupled at the first fixed plate 304A, and separated from the other inner bearing member 308B installed on the second bottom shaft member 312B coupled at the second fixed plate 304B, by a centerplate offset. The centerplate offset is realized between the inner bearing member 308A and the other inner bearing member 308B secured in the first bore 318A and the second bore 318B, respectively. The two side plates 306A and 306B may be adjustably coupled uprightly at side positions of the bottom base plate 302 based on the width of the mast member 102. In some embodiments, the width of mast member 102 may vary between 11.875 inches and 12.125 inches. Accordingly, the distance of either of the two side plates 306A and 306B from the center point between the fixed plates 304A and 304B may vary between 5.938 inches and 6.063 inches. Further, the distance of the first sprocket wheel member 314A and the second sprocket wheel member 314B from the center point between the fixed plates 304A and 304B may be a fixed distance of 4.475 inches. Thus, the alignment of the first sprocket wheel member 314A and the second sprocket wheel member 314B is equidistant from the center point between the fixed plates 304A and 304B and independent of the width of the mast member 102. As the first sprocket wheel member 314A and the second sprocket wheel member 314B are located from the center point, this ensures that the first sprocket wheel member 314A and the second sprocket wheel member 314B are in the same place regardless of the width of the mast member 102. The side plates 306A and 306B may only slide in or out to accommodate the difference in the width of the mast member 102.

As shown, the bottom bearing assembly 106 is installed proximate the bottom section $102_{Bottom}$ of the mast member 102. The first bottom bearing sub-assembly 106A includes the one of the second set of inner bearing members 308A and 308B (e.g., 308A), the one of the second set of outer bearing members 210A and 210B (e.g., 210A), and the first sprocket wheel member 314A installed therebetween on the first bottom shaft member 312A. The first bottom bearing sub-assembly 106A is installed in such a manner that the one of the second set of outer bearing members 310A and 310B (e.g., 310A), couples with the periphery of the first open groove member 320A using the bearing bolt member 340A. Further, one of the second set of inner bearing members 308A and 308B (e.g., 308A), couples with the periphery of the first bore 318A using the bearing bolt member 340B.

Similarly, the second bottom bearing sub-assembly 106B includes the other of the second set of inner bearing members 308A and 308B (e.g., 308B), the other of the second set of outer bearing members 310A and 310B (e.g., 310B), with the second sprocket wheel member 314B installed therebetween on the second bottom shaft member 312B. The second bottom bearing sub-assembly 106B of the bottom bearing assembly 106 is installed in such a manner that the other of the second set of outer bearing members 310A and 310B (e.g., 310B) is coupled with the periphery of the second open groove member 320B using the bearing bolt members 340A and the other of the second set of inner bearing members 308A and 308B (e.g., 308B), is coupled with the periphery of the second bore 318B using the bearing bolt member 340B. In an example embodiment, the first bottom shaft member 312A and the second bottom shaft member 312B are driven by the first shaft drive 108 and the second shaft drive 110, respectively.

Referring to FIG. 3E, guiding rails 344A and 344D installed at the side surfaces, such as $102_{SideCoverMember}$ of the mast member 102 are illustrated. The guiding rails 344B and 344C are coupled at the rear surface, i.e. the $102_{RearCoverMember}$ of the mast member 102. The guiding rails 344A-344D are coupled vertically along the length of the mast member 102. As shown, the guiding member 346A may be positioned at the side surface, such as $102_{SideCoverMember}$ of the mast member 102. Similarly, the guiding member 346B may be positioned at the opposite side surface of the mast member 102. As would be evident to one of ordinary skill in the art in light of the present disclosure, the guiding rails 344A-344D and the guiding members 346A and 346B, as illustrated at least in FIGS. 3D and 3E, may be extended members of the guiding rails 244A-244D and the guiding members 246A and 246B, respectively, as illustrated at least in FIGS. 2H and 2I.

The front nut and bolt member 332 couples the supporting member 330 of the bottom bearing assembly 106 with the cover member $102_{FrontCoverMember}$ at the bottom section $102_{Bottom}$ of the mast member 102. Also, the plurality of rear nut and bolt members 316G-316L couples the back plate 334 of the bottom bearing assembly 106 with the rear cover member $102_{RearCoverMember}$ of the mast member 102 through the mast coupling slot members 336A-336F (positioned on the back plate 334) and slot members on the rear cover member $102_{RearCoverMember}$ of the mast member 102. Further, the bottom bearing assembly 106 may be coupled with the bottom section $102_{Bottom}$ of the mast member 102 through the slot members on the side plate 306A and 306B and corresponding slot members on the side cover member $102_{SideCoverMember}$ of the mast member 102 using the plurality of side nut and bolt members 316M-316R.

Figure 4A:
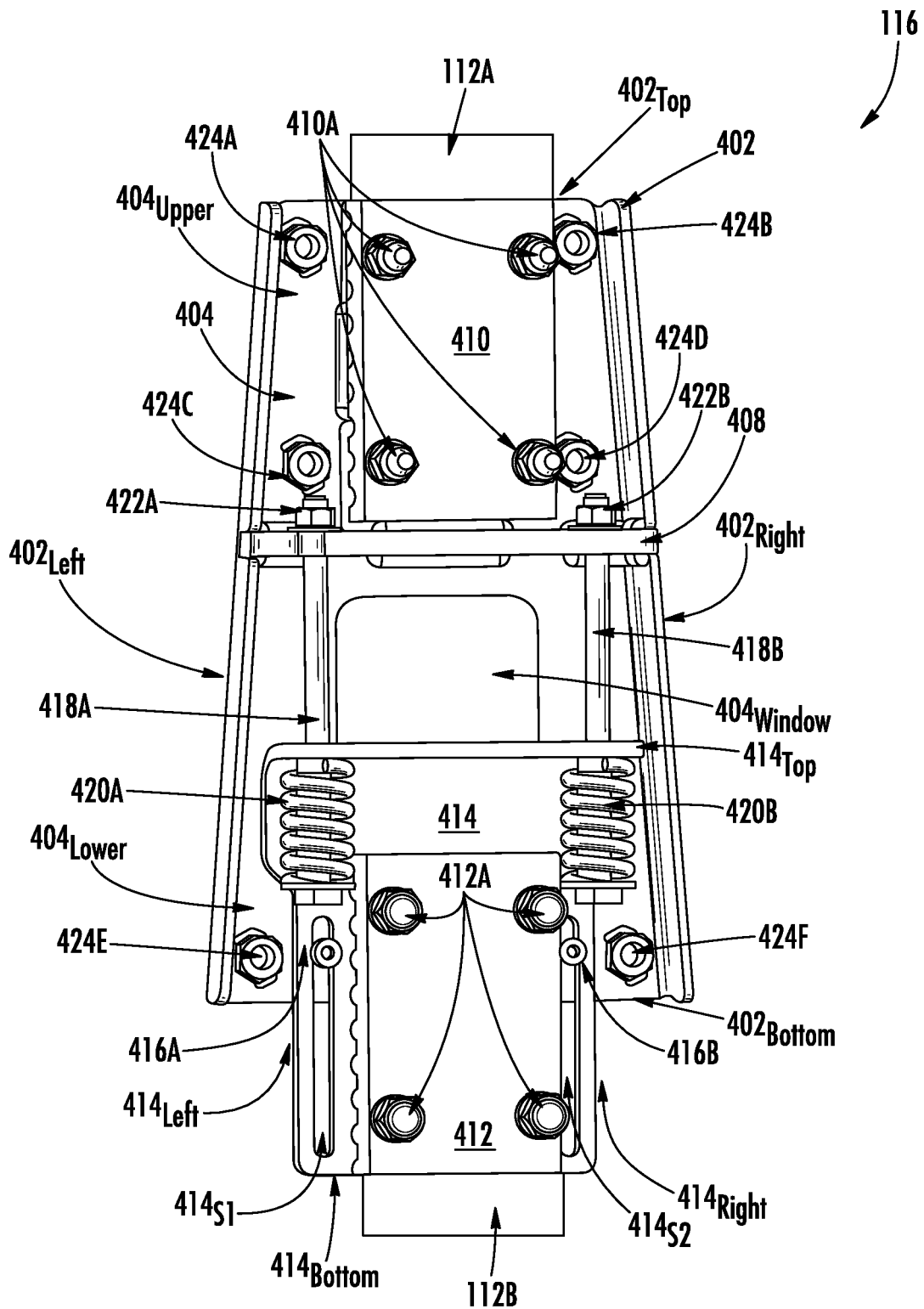
FIGS. 4A-4B illustrate views of a first belt tensioner assembly of the carriage lift assembly in the material handling system of FIG. 1 according to one or more embodiments of the present disclosure.
Figure 4B:
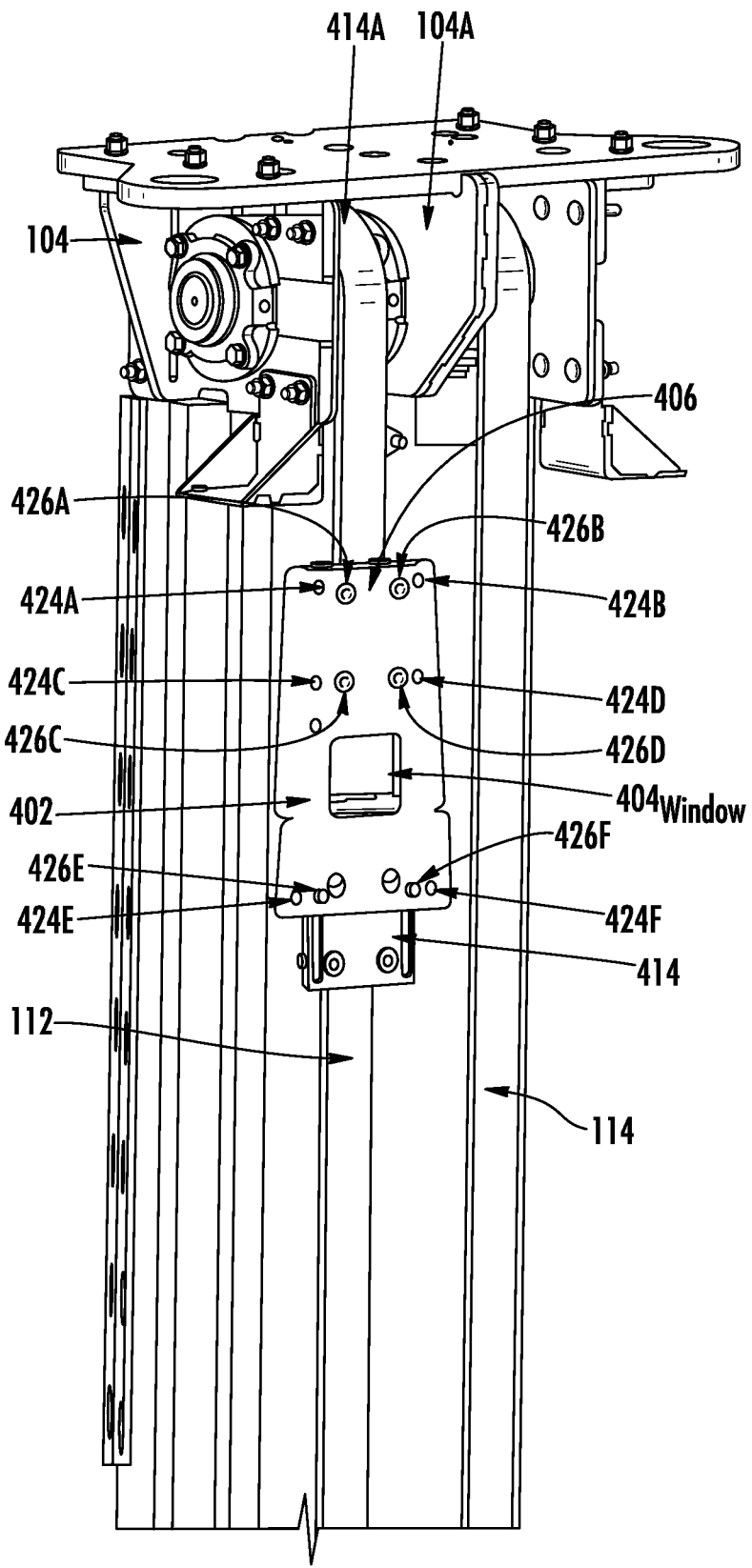

FIGS. 4A-4B illustrate views of the first belt tensioner assembly 116 of the carriage lift assembly 101 in the material handling system 100, as shown in FIG. 1, in accordance with one or more embodiments of the present disclosure. The structure and components of only the first belt tensioner assembly 116 is illustrated in FIGS. 4A-4B. The structure and components of the second belt tensioner assembly 118 are similar to the structure and components of the first belt tensioner assembly 116, and are not shown here for convenience of description.

Referring to FIG. 4A, the rear view of the first belt tensioner assembly 116 is illustrated. The first belt tensioner assembly 116 may include a longitudinal, trapezoidal-shaped tensioner plate 402 having a first surface 404 and a second surface 406. The tensioner plate 402 may be metal plate made up of, for example steel, having a top edge $402_{Top}$, a bottom edge $402_{Bottom}$, a left side edge $402_{Left}$, and a right side edge $402_{Right}$. The top edge $402_{Top}$ and the bottom edge $402_{Bottom}$ may be parallel edges having the length of the top edge $402_{Top}$ being smaller than the length of the bottom edge $402_{Bottom}$. However, the left side edge $402_{Left}$ and the right side edge $402_{Right}$ are slanting edges having the length comparatively greater than the length of the bottom edge $402_{Bottom}$. The left side edge $402_{Left}$ and the right side edge $402_{Right}$ are curved as "L-shaped" edges with a defined width of the left side edge $402_{Left}$ and the right side edge $402_{Right}$ protruding out at right angles with respect to the first surface 404 (e.g., the rear surface of the tensioner plate 402). The second surface 406 may be the front surface of the tensioner plate 402 that abuts the first carriage assembly 120, as described hereinafter.

As shown, the tensioner plate 402 includes a horizontal plate member 408 that is permanently coupled at a defined distance from the top edge $402_{Top}$. The alignment of the horizontal plate member 408 may be parallel with respect to the top edge $402_{Top}$ and the bottom edge $402_{Bottom}$, thus partitioning the first surface 404 of the tensioner plate 402 in two portions, i.e. an upper portion $404_{Upper}$ and a lower portion $404_{Lower}$.

The upper portion $404_{Upper}$ may include a first clamping block 410 that is secured using four nut and bolt members 410A, each positioned proximate the four corners of the first clamping block 410. The first clamping block 410 may be made up of, for example aluminum, having a rough lateral surface that is engaged with a first end 112A of the first belt member 112 that abuts the first surface 404 of the first tensioner plate 402. The first end 112A of the first belt member 112 is secured underneath the first clamping block 410 received from the top edge $402_{Top}$ of the first tensioner plate 402. The first end 112A of the first belt member 112 is secured underneath the first clamping block 410 using the four nut and bolt members 410A. The opposite lateral surface of the first clamping block 410 may be a smooth surface. The rough lateral surface provides substantial frictional force to prevent the first belt member 112 from sliding off once the first belt tensioner assembly 116 induces tension in the first belt member 112.

The lower portion $404_{Lower}$ may include a window $404_{Window}$ that may be slidably covered by a slidable plate 414. The slidable plate 414 may laterally abut the first surface 404 over the window $404_{Window}$ from the bottom edge $404_{Bottom}$ of the tensioner plate 402. The top edge $414_{Top}$ of the slidable plate 414 may be a curved edge of "L-shaped" edge with a defined width protruding out at right angle with respect to the proximal surface of the slidable plate 414. The bottom edge $414_{Bottom}$ of the slidable plate 414 is positioned below the bottom edge of the second clamping block 412. The length of the top edge $414_{Top}$ of the slidable plate 414 may be greater than the bottom edge $414_{Bottom}$. A first portion of the left side edge $414_{Left}$ of the slidable plate 414 proximal to the top edge $414_{Top}$ may be orthogonal to the top edge $414_{Top}$. Subsequent to the first portion, a second portion of the left side edge $414_{Left}$ may be a slanting portion towards the right side edge $414_{Right}$ of the slidable plate 414. Subsequent to the second portion, a third portion of the left side edge $414_{Left}$ may be a straight portion extending towards the bottom edge $414_{Bottom}$ of the slidable plate 414.

The slidable plate 414 further comprises two longitudinal slot members $414_{S1}$ and $414_{S2}$. The longitudinal slot members $414_{S1}$ and $414_{S2}$ may be longitudinally proximal the third portion of the left side edge $414_{Left}$ and the right side edge $414_{Right}$, respectively. The longitudinal slot members $414_{S1}$ and $414_{S2}$ may be configured to provide guiding paths to guiding features 416A and 416B located proximate the bottom edge $404_{Bottom}$ of the first surface 404. The guiding features 416A and 416B engaged in the longitudinal slot members $414_{S1}$ and $414_{S2}$ provide guiding paths for the slidable movement of the slidable plate 414 laterally over the first surface 404 when the two bolt members 418A and 418B are either tightened or loosened. The bolt member 418A is engaged within a slot member in the horizontal plate member 408 and the slot member in the top edge $414_{Top}$ of the slidable plate 414 (that is protruding out as an "L-shaped" edge). The bolt member 418A is positioned proximal the left side edge $402_{Left}$ of the tensioner plate 402. The head end of the bolt member 418A may be proximate the bottom edge $404_{Bottom}$ of the first surface 404 having a spring member 420A disposed thereon between the head end of the bolt member 418A and the bottom surface of the top edge $414_{Top}$ of the slidable plate 414 (that is protruding out as an "L-shaped" edge). The other end of the bolt member 418A may be proximate the top edge $404_{Top}$ of the first surface 404, and fastened with a nut member 422A. Similarly, the bolt member 418B is engaged within a slot member in the horizontal plate member 408 and a slot member in the top edge $414_{Top}$ of the slidable plate 414 (that is protruding out as an "L-shaped" edge). The bolt member 418B is positioned proximal to the right side edge $402_{Right}$ of the tensioner plate 402. The head end of the bolt member 418B may be proximate the bottom edge $404_{Bottom}$ of the first surface 404 having a spring member 420B disposed thereon between the head end of the bolt member 418B and the bottom surface of the top edge $414_{Top}$ of the slidable plate 414 (that is protruding out as an "L-shaped" edge). The other end of the bolt member 418B may be proximate the top edge $404_{Top}$ of the first surface 404, and fastened with a nut member 422B.

There is further shown a second clamping block 412 coupled at the slidable plate 414 using four nut and bolt members 412A, each positioned proximate the four corners of the second clamping block 412. Similar to the first clamping block 410, the second clamping block 412 may be made up of, for example aluminum, having a lateral surface with a belt pattern that is engaged with a second end 112B of the first belt member 112 that abuts the first surface 404 of the first tensioner plate 402. The second end 112B of the first belt member 112 is secured underneath the second clamping block 412 received from the bottom edge $402_{Bottom}$ of the first tensioner plate 402. The second end 112B of the first belt member 112 is secured underneath the second clamping block 412 using the four nut and bolt members 412A. The opposite lateral surface of the second clamping block 412 may be a smooth surface. The distal surface with the belt pattern provides substantial frictional force to prevent the first belt member 112 from sliding off once the first belt tensioner assembly 116 induces tension in the first belt member 112. The two ends 112A and 112B of the first belt member 112 are secured and tensioned by the first belt tensioner assembly 116 at the manufacturing site.

A plurality of slot members 424A-424F for coupling the first tensioner plate 402 with the first carriage assembly 120 using a plurality of bolt members 508A-508F are shown, as described in FIG. 5G. The slot members 424A and 424B are proximal the top edge $402_{Top}$, the slot members 424C and 424D are proximal the horizontal plate member 408 in the upper portion $404_{Upper}$, and the slot members 424E and 424F are proximal the bottom edge $402_{Bottom}$ of the first tensioner plate 402.

Referring to FIG. 4B, the front view of the first belt tensioner assembly 116 securing the first belt member 112 and the upper portion of the carriage lift assembly 101 including at least the top bearing assembly 104, the first belt member 112, and the first belt member 112 is shown. The first belt member 112 is shown mated with the first sprocket wheel member 214A of the first top bearing sub-assembly 104A. Further, though not shown in FIG. 4B, the first belt member 112 also mates with the first sprocket wheel member 314A from the first bottom bearing sub-assembly 106A of the bottom bearing assembly 106. As described above in FIGS. 1-3E, the first belt member 112 mates with the first sprocket wheel member 214A from the first top bearing sub-assembly 104A of the top bearing assembly 104 and the first sprocket wheel member 314A from the first bottom bearing sub-assembly 106A of the bottom bearing assembly 106.

Further, there are shown six weld nuts 426A-426F on the second surface 406 of the tensioner plate 402 in the first belt tensioner assembly 116. The six weld nuts 426A-426F may be engaged with corresponding locating slot members in the center plate of the first carriage assembly 120 so that the first carriage assembly 120 is properly and easily coupled with the first belt tensioner assembly 116. Thus, the six weld nuts 426A-426F act as both mounting and locating features.

Thus, the first belt tensioner assembly 116 allows the first belt member 112 to be tensioned without being attached to the first carriage assembly 120. This means that the first belt member 112 may be tensioned in the manufacturing facility rather than in the operational facility or in the field. Also, removal the first carriage assembly 120 for maintenance may be accomplished without releasing the tension in the first belt member 112. In some instances, the first belt member 112 needs only to be tensioned once for its entire life.

Once the first belt member 112, installed on the mast member 102, is properly tensioned by the first belt tensioner assembly 116 in the manufacturing facility, as shown in FIG. 4B, the mast member 102 with the first belt tensioner assembly 116 may be shipped to the field. In the field, the carriages, for example, the first carriage assembly 120 may be easily attached to the first belt tensioner assembly 116 using six bolt members through the plurality of slot members 424A-424F and the corresponding plurality of slot members in the center plate of the first carriage assembly 120. Once fixed in place, the tension in the first belt member 112 may be adjusted using the two bolt members 418A and 418B shown in FIG. 4A. The two bolt members 418A and 418B are accessible from underneath the first carriage assembly 120 and no other attachment or part needs to be removed to adjust the tension in the first belt member 112. The bolt members 418A and 418B adjusts the tension the first belt member 112 by tightening or loosening until the spring members 420A and 420B are compressed or decompressed to a desired extent to provide an appropriate final tension in the first belt member 112 in the operational facility.

In various embodiments, the spring members 420A and 420B may be a significant component of the first belt tensioner assembly 116. The first purpose of the spring members 420A and 420B is to ensure that the first belt member 112 is tensioned properly. The second purpose of the spring members 420A and 420B is to maintain tension on the first belt member 112 continuously during the travel of the first carriage assembly 120 along the length of the mast member 102. For example, when the first carriage assembly 120 travels down along the length of the mast member 102, the spring members 420A and 420B take up any slack in the first belt member 112 to ensure that the corresponding belt member is always tensioned.

FIGS. 5A-5J illustrate views of the first carriage assembly 120, in accordance with one or more embodiments of the present disclosure. It may be noted that there is shown the structure and components of only the first carriage assembly 120 in FIGS. 5A-5J. The structure and components of the second carriage assembly 122 is similar to the structure and components of the first carriage assembly 120, and not shown here for convenience of description.

Figure 5A:
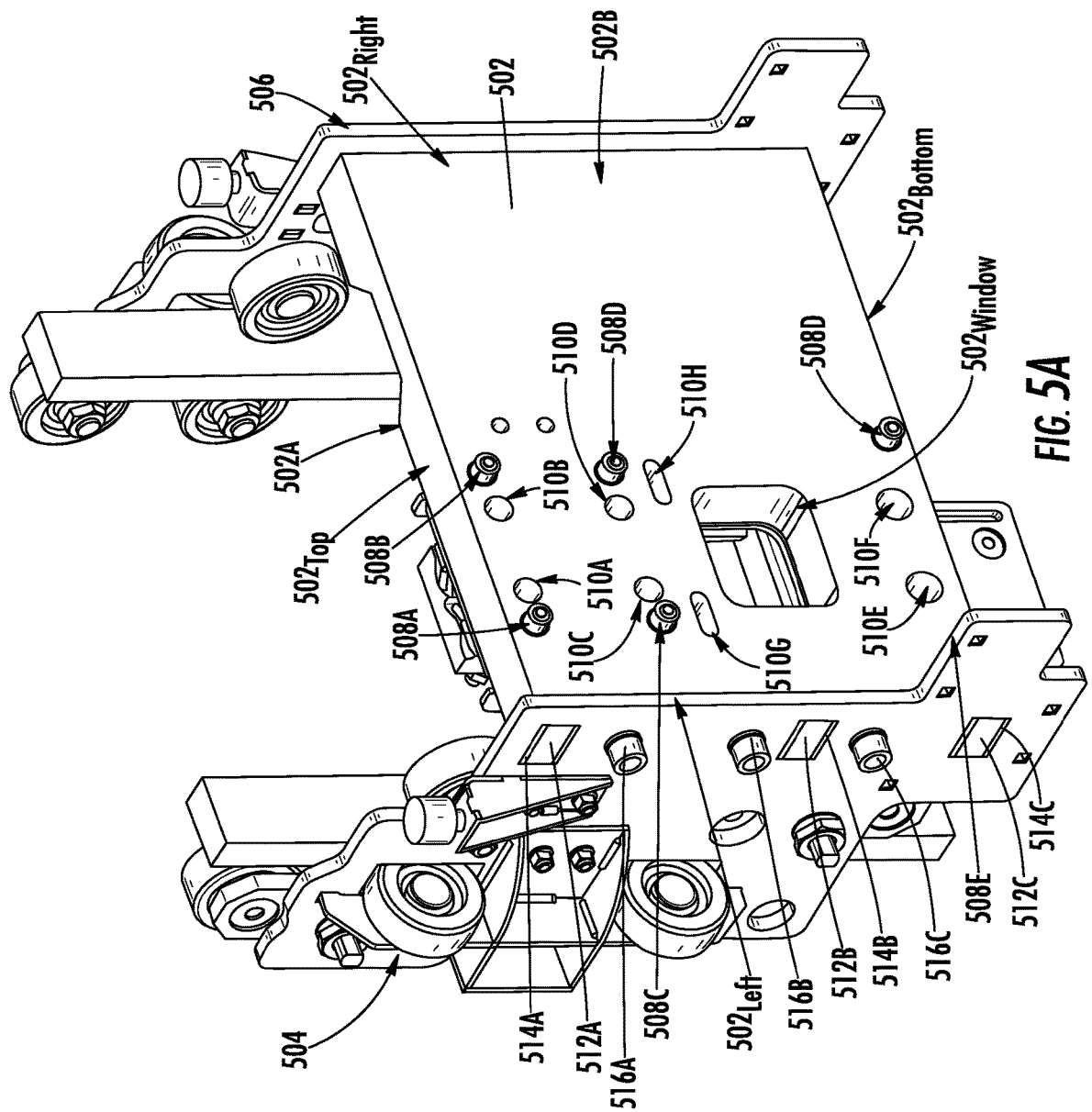

Referring to the first carriage assembly 120 in FIGS. 5A (first front perspective view) and 5B (second front perspective view), a center plate 502 and two side plates 504 and 506 are shown. The center plate 502 may be of a symmetrical shape, such as a rectangular shape, having a first surface 502A and a second surface 502B. The center plate 502 may have a top edge $502_{Top}$, a bottom edge $502_{Bottom}$, a left side edge $502_{Left}$, and a right side edge $502_{Right}$. The first surface 502A may be the surface that is removably attached to a belt tensioner assembly, such as the first belt tensioner assembly 116, coupled proximal to and parallel to the left side edge $502_{Left}$ of the center plate 502. The first belt tensioner assembly 116 may be coupled with the first surface 502A using a plurality of bolt members 508A-508F.

The center plate 502 may further include a plurality of access holes 510A-510F configured to receive the six weld nuts 426A-426F at the second surface 406 of the first belt tensioner assembly 116. The six weld nuts 426A-426F may be engaged with corresponding access holes 510A-510F in the center plate 502 of the first carriage assembly 120 so that the first surface 502A of the first carriage assembly 120 is properly and easily coupled with the first belt tensioner assembly 116. Such six access holes 510A-510F may be circular in shape. There may be two other slot members 510G and 510H longitudinal in shape aligned laterally on the center plate 502. The center plate 502 may also include a window $502_{Window}$ that overlaps with the window $404_{Window}$ and provides a view to an operator about the current position of the slidable plate 414 in the first belt tensioner assembly 116. The second surface 502B may be a surface, opposite to the first surface 502A, engaged with a belt cartridge, as shown in FIG. 1.

Figure 5B:
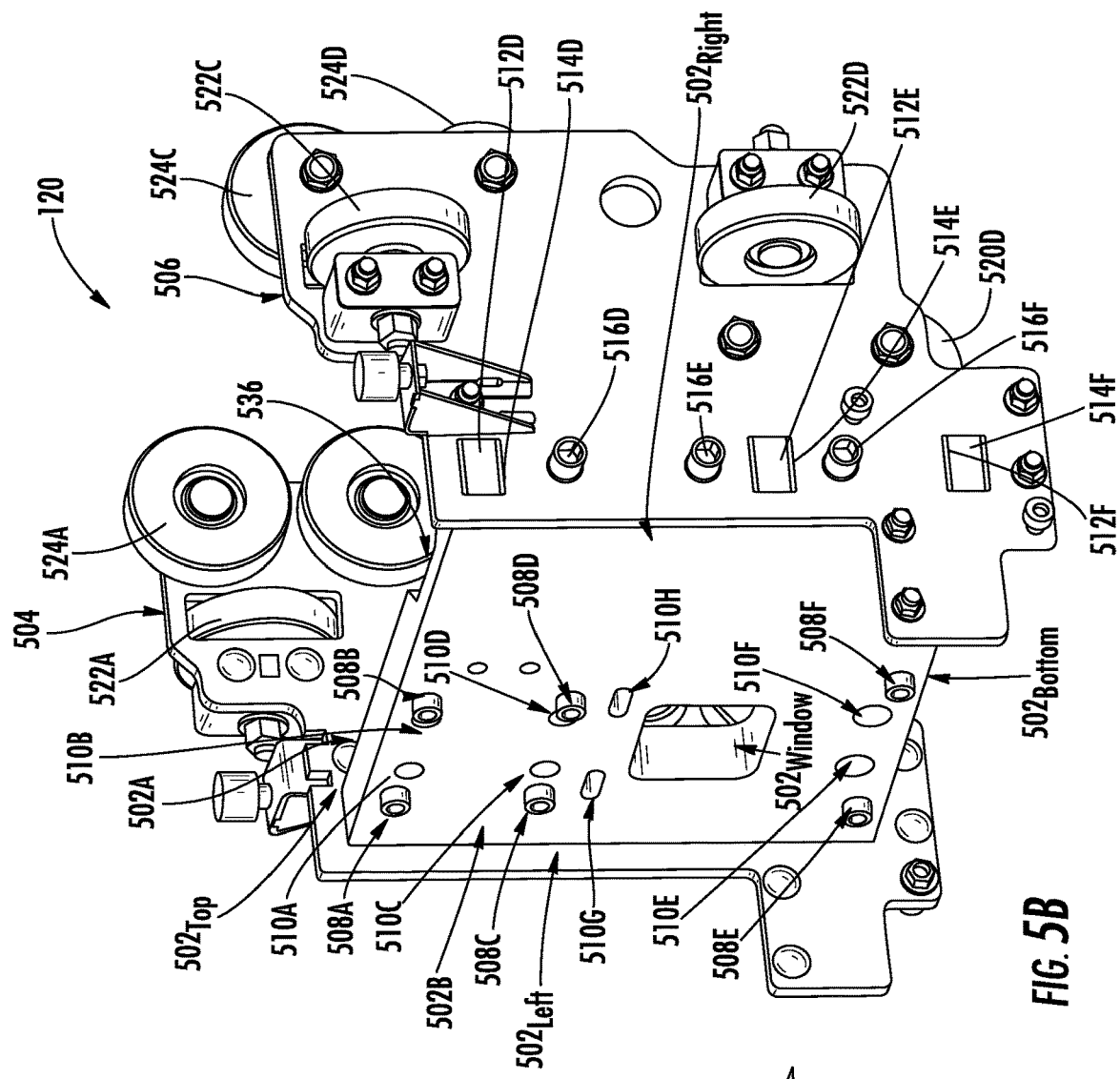
Figure 5B:
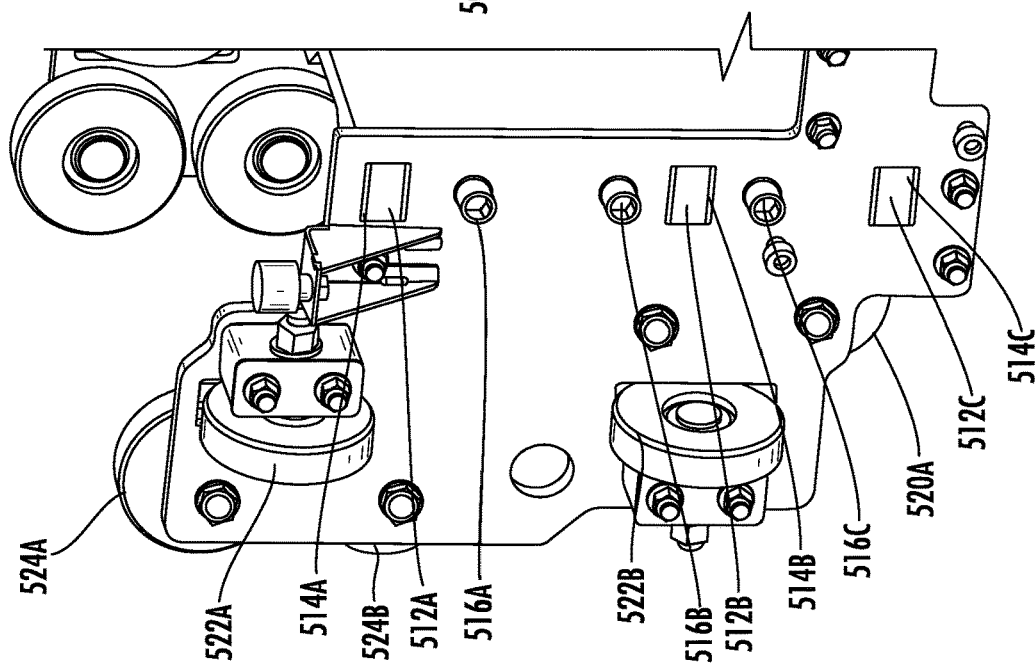

The center plate 502 may further have a plurality of protruding members 512A-512F, of which protruding members 512A-512C are shown in FIG. 5A; however, the protruding members 512D-512F are not shown in the perspective view shown in FIG. 5A, but are shown in FIG. 5B. As shown in FIG. 5A, the protruding members 512A-512C may be configured to be received in the plurality of slot members 514A-514C of the side plate 504 and bolted therein. Similarly, as shown in FIG. 5B, the protruding members 512D-512F may be configured to be received in the plurality of slot members 514D-514F of the side plate 506 and bolted therein. Further, a plurality of nut and bolt members 516A-516C that may be fastened once the protruding members 512A-512C of the center plate 502 are received in the plurality of slot members 514A-514C of the side plate 504 are shown. Similarly, as shown in FIG. 5B, a plurality of nut and bolt members 516D-516F may be fastened once the protruding members 512D-512F of the center plate 502 are received in the plurality of slot members 514D-514F of the side plate 506.

Figure 5C:
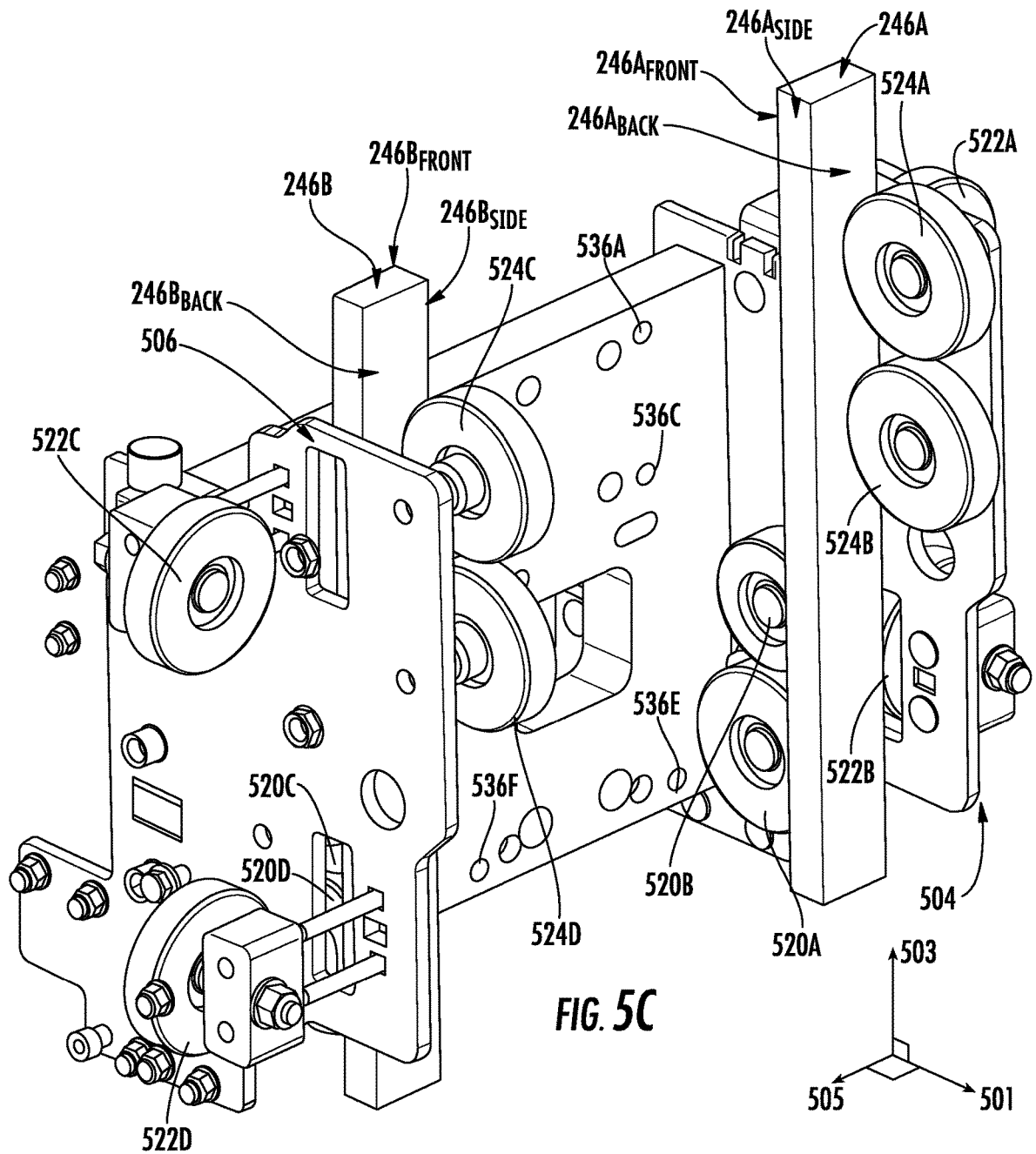

Referring to FIG. 5C, a perspective rear view of the first carriage assembly 120 having a plurality of guiding wheel members 520A-520D, 522A-522D, and 524A-524D coupled therein is shown. The guiding member 246A may have a front surface $246A_{Front}$, a rear surface $246A_{Rear}$, and an outer side surface $246A_{side}$. The inner side surface of the guiding member 246A may be fixed with the side cover member $102_{SideCoverMember}$ of the mast member 102. Similarly, the guiding member 246B may have a front surface $246B_{Front}$, a rear surface $246B_{Rear}$, and an outer side surface $246B_{Side}$. The inner side surface of the guiding member 246B may be fixed with the opposite side cover member $102_{SideCoverMember}$ of the mast member 102. The arrangement of the guiding member 246A and 246B are described in detail with reference to FIGS. 2F and 2G.

As shown in FIG. 5C, the guiding wheel members 520A and 520D may be proximal the center plate 502 and positioned adjacent to the bottom edge of the side plates 504 and 506, respectively. The guiding wheel members 520B and 520C may also be proximal the center plate 502 and vertically positioned above the guiding wheel members 520A and 520D of the side plates 504 and 506, respectively. The axis of the guiding wheel members 520A-520D may be parallel with respect to the directional axis 505. The guiding wheel members 520A-520D may be positioned in such a manner that the wheel surfaces of the guiding wheel members 520A-520D abut the front surfaces $246A_{Front}$ and $246B_{Front}$ of the guiding members 246A and 246B, respectively.

Further, the guiding wheel members 522A and 522C, positioned on the side plates 504 and 506, respectively, may be proximal the top edge $502_{Top}$ of the center plate 502. The guiding wheel members 522B and 522D, positioned on the side plates 504 and 506, respectively, may be proximal the bottom edge $502_{Bottom}$ of the center plate 502. The axis of the guiding wheel members 522A-522D may be parallel with respect to the directional axis 501. The guiding wheel members 522A-522D may be positioned in such a manner that the wheel surfaces of the guiding wheel members 522A-522D abut the outer side surfaces $246A_{Side}$ and $246B_{Side}$ of the guiding members 246A and 246B, respectively.

Furthermore, the guiding wheel members 524A and 524C may be distal from the center plate 502 and positioned adjacent the top edge of the side plates 504 and 506, respectively. The guiding wheel members 524B and 524D may also be distal from the center plate 502 and vertically positioned below the guiding wheel members 524A and 524C of the side plates 504 and 506, respectively. The axis of the guiding wheel members 524A-524D may be parallel with respect to the directional axis 505. The guiding wheel members 524A-524D may be positioned in such a manner that the wheel surfaces of the guiding wheel members 524A-524D abut the rear surfaces $246A_{Rear}$ and $246B_{Rear}$ of the guiding members 246A and 246B, respectively.

It may be noted that inner sides of the guiding members 246A and 246B may be coupled with the respective side cover members $102_{SideCoverMembers}$ of the mast member 102, as shown in FIGS. 2F and 2G. Further, the guiding wheel members 520A-520D and 522A-522D from the plurality of guiding wheel members 520A-520D, 522A-522D, and 524A-524D may correspond to a first set of guiding members that may be configured to receive and engage with the guiding members 246A and 246B while installing the first carriage assembly 120 on the mast member 102. Furthermore, the guiding wheel members 524A-524D may correspond to a second set of guiding members that may be configured to receive and engage with the guiding members 246A and 246B when the first carriage assembly 102 has been installed on the mast member 102. Each of the plurality of guiding wheel members 520A-520D, 522A-522D, and 524A-524D may be made up of different grades of materials, such as elastomers (rubber and polyurethane), phenolic, or nylons. The selection of a proper wheel may be dependent based on various application factors, such as field conditions, load, rollability, and speed. There is further shown in FIG. 5B a plurality of slot members 536A-536D (as shown in FIG. 5C) that may be configured to be overlapped with the plurality of slot members 424A-424F of the tensioner plate 402 of the first belt tensioner assembly 116 and may be secured with each other using the plurality of bolt members 508A-508F (as shown in FIG. 5E).

Figure 5D:
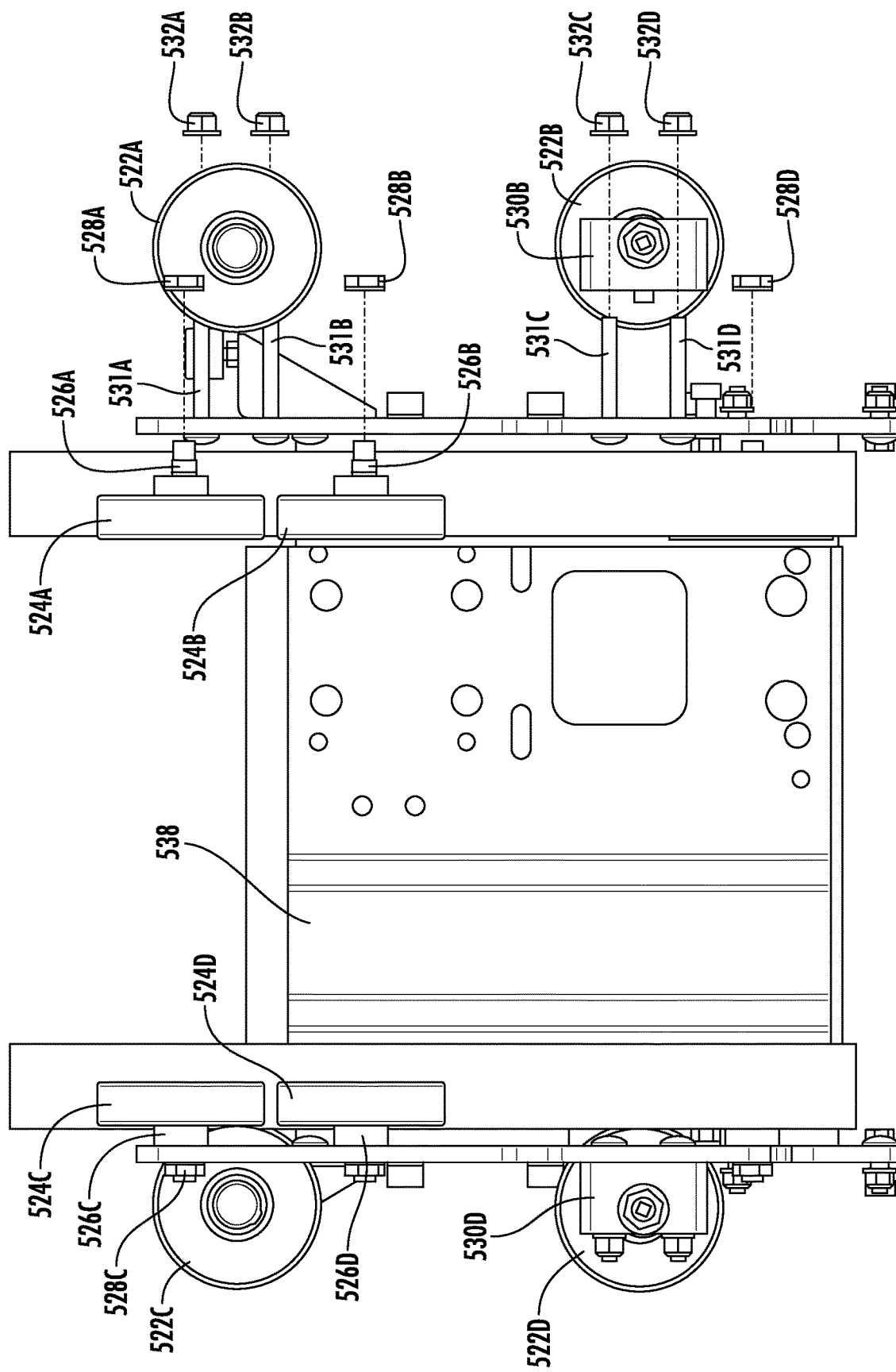
Figure 5E:
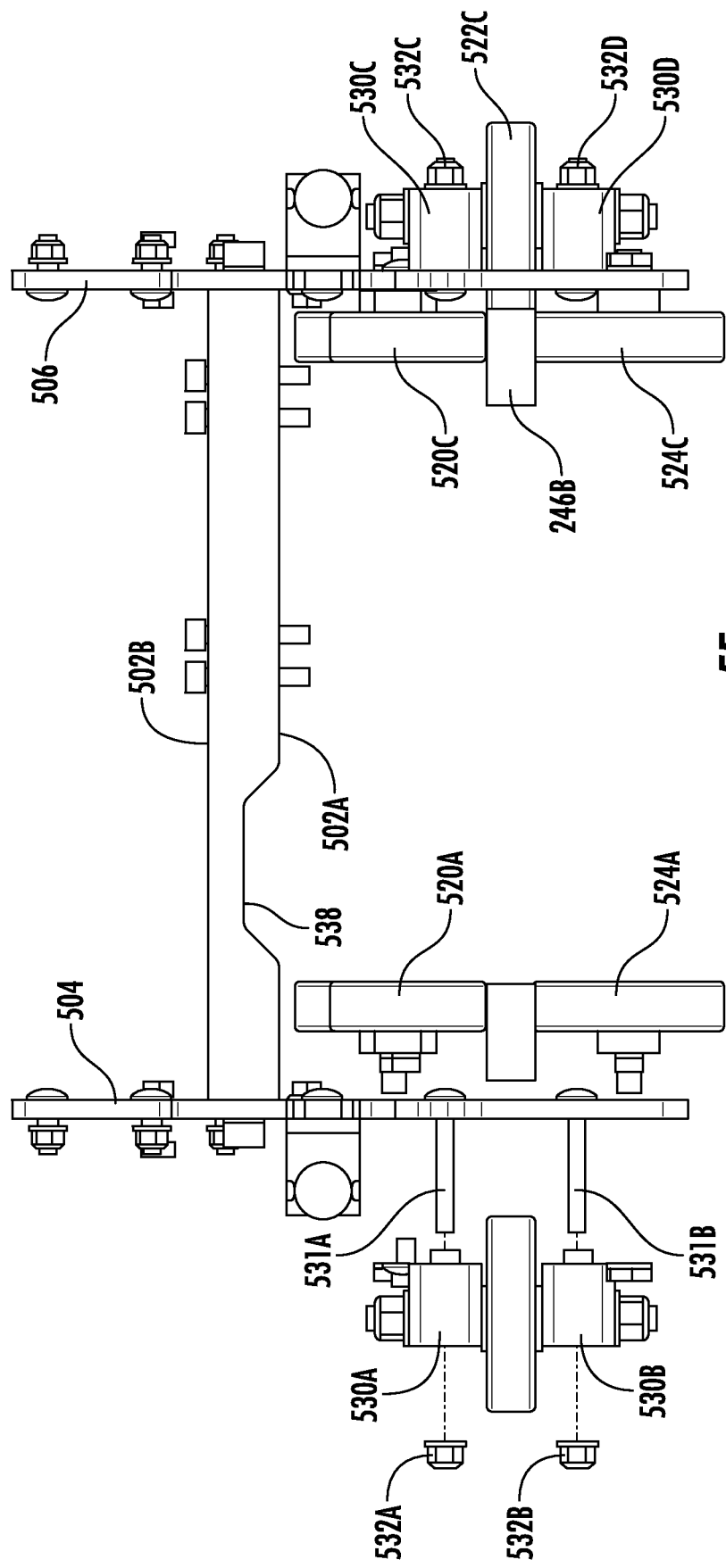
Figure 5F:
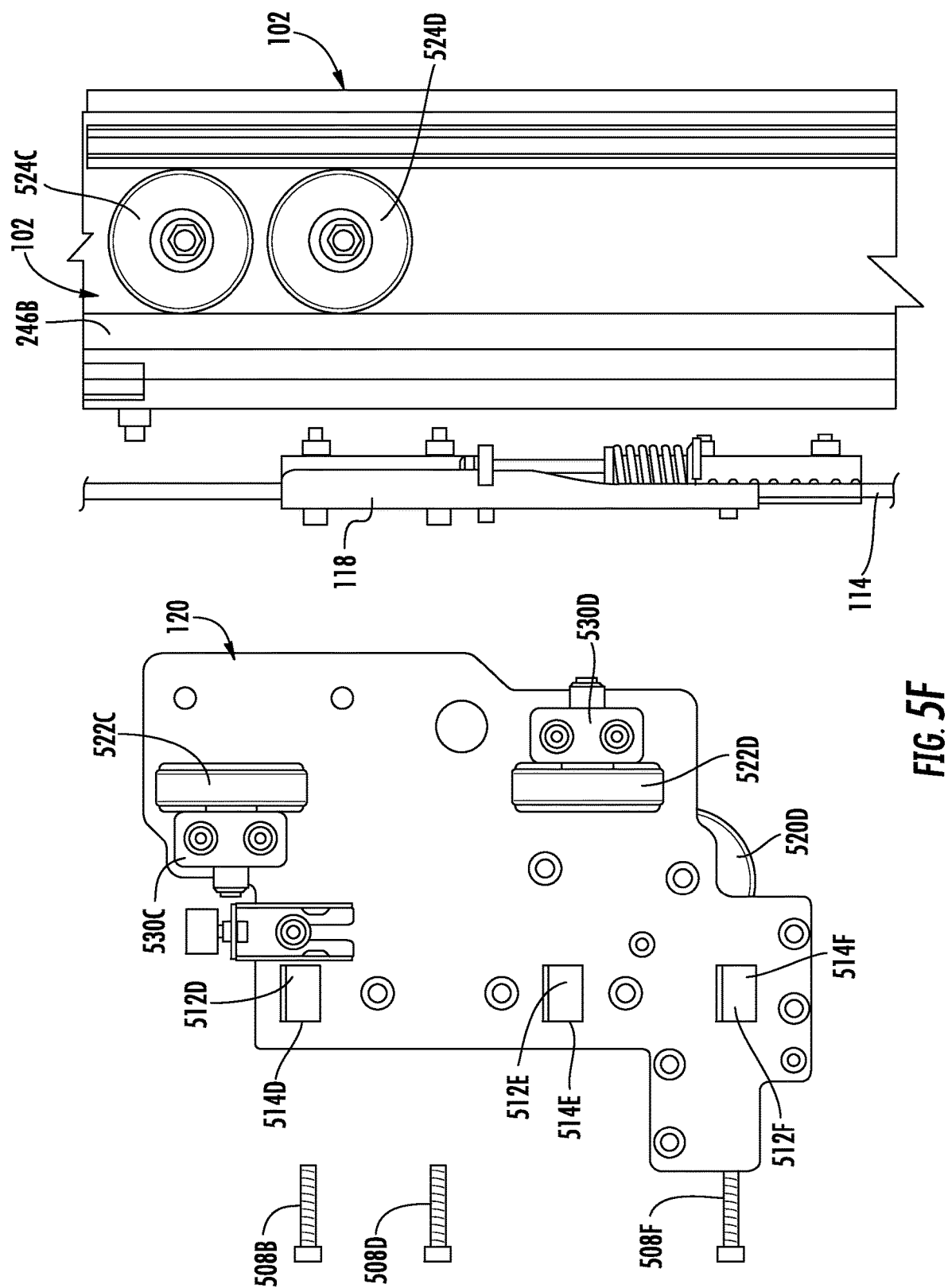
Figure 5H:
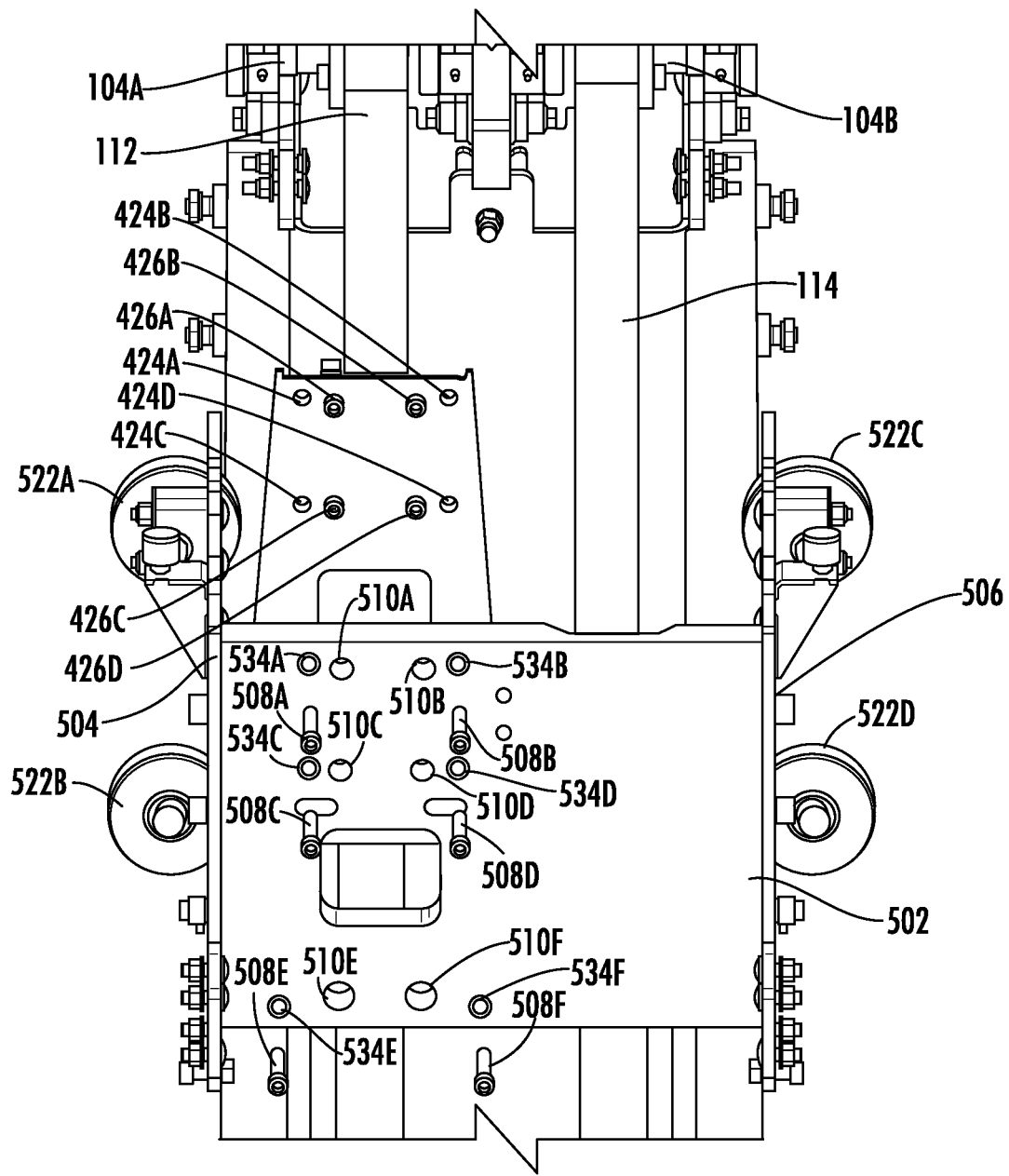
Figure 5I:
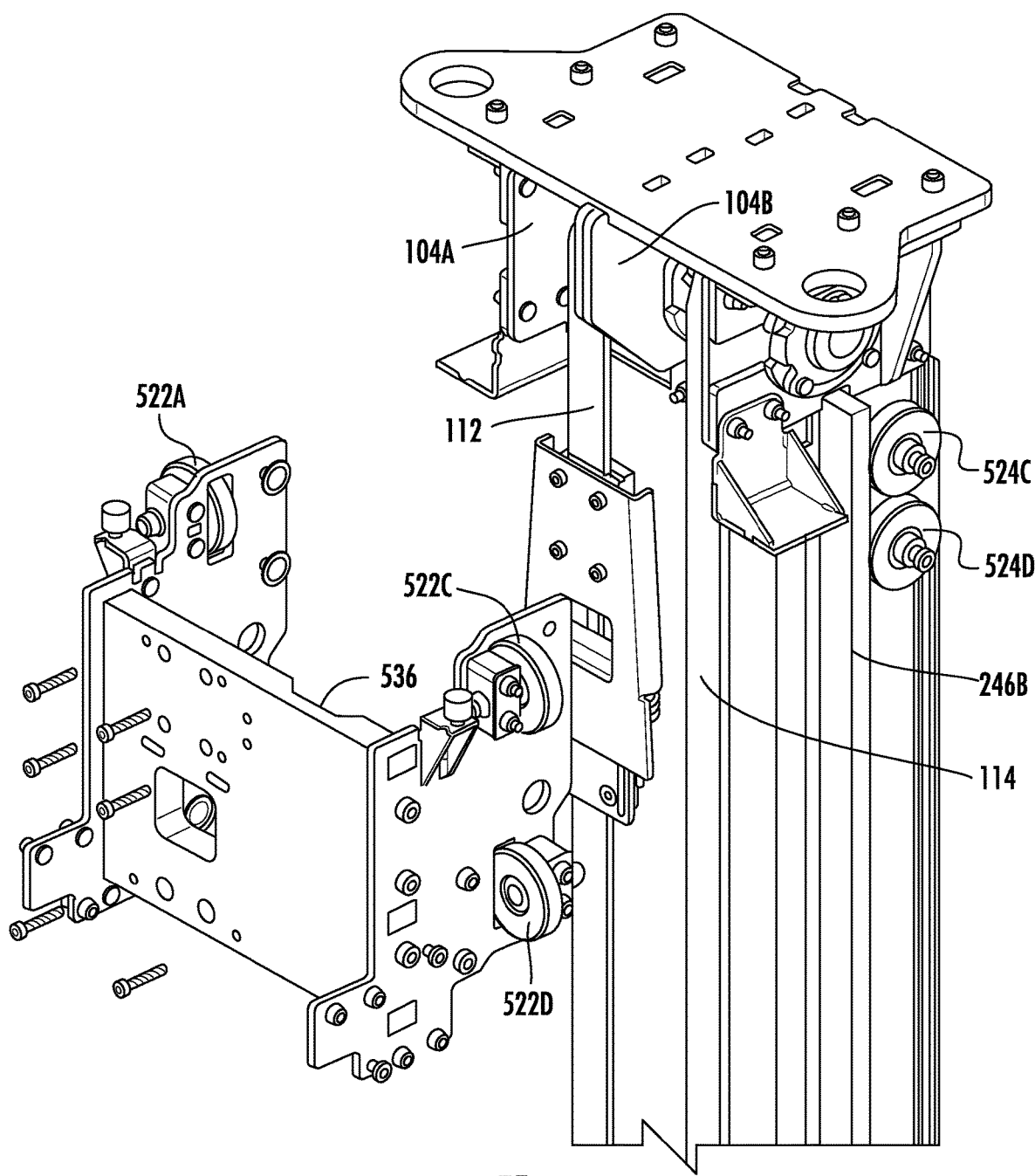

Referring to FIGS. 5D and 5E the rear view and top view, respectively, of the first carriage assembly 120 are shown having a plurality of guiding wheel members 520A-520D, 522A-522D, and 524A-524D coupled therein. The guiding wheel members 520A-520D and 524A-524D may be bearing wheel type rollers, having a nylon surface, for example, which may be directly coupled with the side plates 504 and 506. The direct coupling may be done through a fastening mechanism, such as nut and bolt fasteners of the guiding wheel members 520A-520D and 524A-524D. For example, as shown in FIG. 5C, the guiding wheel members 524A-524D may include fixed bolt members 526A-526D, respectively, in the form of an axle of the guiding wheel members 524A-524D. However, not shown in FIG. 5C, the guiding wheel members 520A-520D may also include fixed bolt members, that are occluded by the guiding members 246A and 246B, in form of an axle of the guiding wheel members 520A-520D. Such fixed bolt members 526A-526D of the guiding wheel members 524A-524D may be fastened by nut members 528A-528D, respectively. Other fixed bolt members of the guiding wheel members 520A-520D may be fastened by corresponding nut members that are occluded by the guiding members 246A and 246B.

In some embodiments, the guiding wheel members 522A-522D may be bearing wheel type rollers, having nylon surface, for example, which may be coupled with the side plates 504 and 506 through casters 530A-530D. The casters 530A-530D may be coupled through fastening mechanisms, such as nut and long bolt fasteners. For example, as shown in FIGS. 5D and 5E, the guiding wheel members 522A and 522B may include long bolt members (531A and 531B) and (531C and 531D) respectively.

The first surface 502A of the center plate 502 of the first carriage assembly 120 includes two longitudinal portions. In the first portion that is proximal to the left side edge $502_{Left}$ of the center plate 502, there is adjusted the first belt tensioner assembly 116. In the second portion that is proximal to the right side edge $502_{Right}$ of the center plate 502, there is positioned a trapezoidal shaped longitudinal clearance 538 that may be configured to provide a space for adjustment of the second belt member 114. The shorter width of the trapezoidal shaped longitudinal clearance 538 may be substantially same as the width of the second belt member 114. However, not shown in FIGS. 5D and 5E, the guiding wheel members 522C and 522D may also include long bolt members. As they are already bolted, hence not illustrated. Such long bolt members 531A-531D of the guiding wheel members 522A and 522B may be fastened by nut members 532A-532D, respectively.

Said differently, the first set of guiding wheel members 520A-520D and 522A-522D may be configured to receive the guiding members 246A and 246B on side walls of the mast member 102 while installing the first carriage assembly 120 on the mast member 102. The second set of guiding wheel members 524A-524D may be coupled with the two side plates 504 and 506 when the first carriage assembly 120 is installed on the mast member 102. In an embodiment, the second set of guiding wheel members 524A-524D may be removed from the two side plates 504 and 506 when the first carriage assembly 120 is to be removed from the mast member 102.

Referring to FIGS. 5F-5J, there are illustrated different views of an assembly of the first carriage assembly 120 with the first belt tensioner assembly 116, the first belt member 112, and the second belt member 114, in accordance with one or more embodiments of the present disclosure. There is shown the side views in FIGS. 5F and 5G in which the first carriage assembly 120 is being installed on the mast member 102.

As described above, the first belt member 112 is vertically positioned along the one side, (e.g., left side), of the mid section $102_{Mid}$ of the mast member 102 between a sprocket wheel member of the first top bearing sub-assembly 104A and corresponding vertically aligned sprocket wheel member of the first bottom bearing sub-assembly 106A. Similarly, the second belt member 114 is vertically positioned along the other side of the mid section $102_{Mid}$ of the mast member 102 between another sprocket wheel member of the second top bearing sub-assembly 104B and corresponding vertically aligned another sprocket wheel member of the second bottom bearing sub-assembly 106B. Appropriate tension may be provided in the first belt member 112 and the second belt member 114 by the first belt tensioner assembly 116 and the second belt tensioner assembly 118, respectively, in the manufacturing facility.

The first set of guiding wheel members 520A-520D and 522A-522D may be configured to receive the guiding members 246A and 246B on side walls of the mast member 102 while installing the first carriage assembly 120 on the mast member 102. The plurality of access holes 510A-510F may receive the six weld nuts 426A-426F at the second surface 406 of the first belt tensioner assembly 116. Consequently, the plurality of slot members 536A-536D are overlapped with the plurality of slot members 424A-424F of the tensioner plate 402 of the first belt tensioner assembly 116 and may be secured with each other using the plurality of bolt members 508A-508F and nut members 428A-428F (as shown in FIG. 5J). The second set of guiding wheel members 524A-524D are coupled with the two side plates 504 and 506 when the first carriage assembly 120 is installed on the mast member 102. In an embodiment, the second set of guiding wheel members 524A-524D may be removed from the two side plates 504 and 506 when the first carriage assembly 120 is to be removed from the mast member 102.

It must be noted that, as used in this specification and the appended claims, the singular forms "a," "an" and "the" include plural referents unless the content clearly dictates otherwise. References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A carriage lift assembly comprising:
   a mast member, wherein the mast member defines two or more guiding members;
   a top bearing assembly removably installed proximate a top section of the mast member, wherein the top bearing assembly comprises one or more sub-assemblies;
   a bottom bearing assembly removably installed proximate a bottom section of the mast member, wherein the bottom bearing assembly comprises one or more sub-assemblies;
   one or more belt members, wherein each belt member is configured to mate with a pair of sprocket wheel members, wherein a first sprocket wheel member of the pair of sprocket wheel members corresponds to a first top bearing sub-assembly of the top bearing assembly, and wherein a second sprocket wheel member of the pair of sprocket wheel members correspond to a first bottom bearing sub-assembly of the bottom bearing assembly;
   one or more belt tensioner assemblies configured to provide tension in the one or more belt members, wherein a first belt tensioner assembly defines a first clamping block coupled with a top end of a tensioner plate, a second clamping block coupled with a bottom end of a slidable plate member engaged with a bottom end of the tensioner plate, and a pair of bolt members configured to engage the slidable plate member with the tensioner plate,
      wherein the first clamping block and the second clamping block in the first belt tensioner assembly are configured to secure a first and a second end of a first belt member of the one or more belt members to provide an initial tension in the first belt member,
      wherein the pair of bolt members is adjusted under an influence of an external force to move the slidable plate member along a longitudinal axis of the tensioner plate to provide a final tension in the first belt member; and
   one or more carriage assemblies removably attached to the one or more belt tensioner assemblies via the two or more guiding members, wherein each carriage assembly defines a center plate configured to be removably attached to the first belt tensioner assembly, and two side plates, wherein the two side plates define:
      a fixed set of guiding wheel members configured to receive a first set of guiding members on side walls of the mast member in an instance in which each carriage assembly is installed on the mast member; and
      a removable set of guiding wheel members configured to receive the two side plates and the first set of guiding members in an instance in which each carriage assembly is coupled to the mast member.

2. The carriage lift assembly according to claim 1, wherein the first sprocket wheel member and the second sprocket wheel member are aligned along a length of the mast member.

3. The carriage lift assembly according to claim 1, further comprising one or more shaft drives, wherein a first shaft drive of the one or more shaft drives is configured to drive a first bottom shaft member on which the second sprocket wheel member is installed in the first bottom bearing sub-assembly of the bottom bearing assembly.

4. The carriage lift assembly according to claim 1,
   wherein the first clamping block is fixed at a top end on a first surface of a tensioner plate of the first belt tensioner assembly,
   wherein the second clamping block is fixed on a slidable plate laterally abutting the first surface at a bottom end of the tensioner plate of the first belt tensioner assembly.

5. The carriage lift assembly according to claim 4,
   wherein the first end of the first belt member is secured in the first clamping block of the first belt tensioner assembly,
   wherein the second end of the first belt member is secured by the second clamping block of each of the first belt tensioner assembly.

6. The carriage lift assembly according to claim 4,
   wherein the second clamping block of first belt tensioner assembly further comprises a pair of bolt members,
   wherein the pair of bolt members is configured to engage a slidable plate member and adjust under an influence of an external force to move the slidable plate along a longitudinal axis of the first belt tensioner assembly.

7. A bearing assembly for use in a carriage lift assembly, the bearing assembly comprising:
   a base plate;
   one or more fixed plates, wherein each of the one or more fixed plates is configured to bolt to a back of a mast member, wherein a first fixed plate defines a first bore member configured to receive a first inner bearing member,
   a first side plate configured to be adjustably fixed at a side position of the mast member based on a width of the mast member, wherein the first side plate defines an open groove member configured to receive a first outer bearing member; and
   at least a first sprocket wheel member installed on a first shaft member having the first inner bearing member and aligned within the first fixed plate and the first side plate,
   wherein alignment of the first sprocket wheel member is such that the bearing assembly is configured to attach to the mast member independent of the width of the mast member.

8. The bearing assembly according to claim 7,
   wherein the bearing assembly is a top bearing assembly installed proximate a top section of the mast member,
   wherein the first shaft member is a first top shaft member in an instance in which the first top shaft member corresponds to a top bearing assembly, and wherein the first top shaft member is driven under an influence of a first belt member mating with corresponding sprocket wheels.

9. The bearing assembly according to claim 7,
   wherein the bearing assembly is a bottom bearing assembly installed proximate a bottom section of the mast member, wherein the first shaft member is a first bottom shaft member in an instance in which the first bottom shaft member corresponds to a bottom bearing assembly, wherein the first bottom shaft member is driven by a first shaft drive.

10. The bearing assembly according to claim 7, wherein the first inner bearing member is fixed at a first end of the first shaft member, and
wherein the first outer bearing member is floating at a second end of the first shaft member.

11. The bearing assembly according to claim 7, wherein the first inner bearing member is attached with the first fixed plate,
wherein the first outer bearing member received by the open groove member floats on the first shaft member until the first side plate is bolted to the base plate, and
wherein the first outer bearing member is attached with the first side plate when the first side plate is bolted to the base plate,
wherein the open groove member in the first side plate is covered by a first covering plate when the first outer bearing member is attached with the first side plate.

12. The bearing assembly according to claim 7, wherein the first sprocket wheel member from each of a top bearing assembly and a bottom bearing assembly is aligned along a length of the mast member and constitute a first set of sprocket wheel members,
wherein the first set of sprocket wheel members, to which a first belt member mates is fixed, are located at a first distance from the first fixed plate,
wherein a distance between the first fixed plate and the first side plate is within a defined tolerance level and independent of the first distance.

13. The bearing assembly according to claim 7, wherein the base plate comprises a plurality of slot members configured to receive protruding members of the first side plate upon mounting,
wherein the first side plate is configured to be adjusted by loosening a plurality of bolting members and moving the first side plate inwards or outwards along a longitudinal axis of the base plate based on the width of the mast member, and
wherein a movement of the first side plate inwards or outwards along the longitudinal axis of the base plate based on the width of the mast member is limited by clearances provided by the plurality of slot members.

14. A belt tensioner assembly for use in a carriage lift assembly, the belt tensioner assembly comprising:
a tensioner plate having a first surface and a second surface;
a first clamping block laterally abutting the first surface and coupled with a top end of the tensioner plate, wherein the first clamping block is operable to secure a first end of a belt member;
a slidable plate member laterally abutting the first surface at a bottom end of the tensioner plate, wherein the slidable plate member is operable to slide along a longitudinal axis of the tensioner plate;
a second clamping block laterally abutting the slidable plate member and coupled with a bottom end of the slidable plate member,
wherein the second clamping block is operable to secure a second end of a belt member, and
wherein the first clamping block and the second clamping block are configured to provide an initial tension in the belt member; and
a pair of bolt members configured to couple the slidable plate member with a fixed plate member located horizontally on the first surface,
wherein the pair of bolt members are adjusted under an influence of an external force to move the slidable plate member along the longitudinal axis of the tensioner plate, and
wherein the pair of bolt members is configured to provide a final tension in the belt member.

15. The belt tensioner assembly according to claim 14, wherein the belt tensioner assembly is configured to maintain the initial tension in the belt member in an instance in which a carriage assembly is removed from the belt tensioner assembly,
wherein the initial tension is provided by the belt tensioner assembly in the belt member prior to attachment with the carriage assembly.

16. The belt tensioner assembly according to claim 14 wherein the belt tensioner assembly includes a plurality of features on the second surface for suitably coupling a center plate of a carriage assembly with the second surface of the belt tensioner assembly.

17. The belt tensioner assembly according to claim 14, wherein the adjustment of the pair of bolt members corresponds to tightening of the pair of bolt members until corresponding spring members are compressed to a specific amount.

18. A carriage assembly for use in a carriage lift assembly, the carriage assembly comprising:
a center plate configured to be removably attached to a belt tensioner assembly at a first lateral surface via a plurality of bolting members; and
two side plates defining:
a fixed set of guiding wheel members configured to receive a first set of guiding members on side walls of a mast member in an instance in which the carriage assembly is installed on the mast member; and
a removable set of the plurality of guiding wheel members configured to receive the two side plates and the first set of guiding members in an instance in which the carriage assembly is coupled to the mast member.

19. The carriage assembly according to claim 18, wherein the removable set of the plurality of guiding wheel members are removable from the two side plates when the carriage assembly is to be removed from the mast member.

20. The carriage assembly according to claim 18, wherein a second lateral surface of the center plate is engaged with a belt cartridge.

* * * * *